United States Patent
Chu et al.

(10) Patent No.: US 11,532,824 B2
(45) Date of Patent: Dec. 20, 2022

(54) CURRENT COLLECTOR FOR A STACKED BATTERY DESIGN

(71) Applicant: Apple Inc., Cupertino, CA (US)

(72) Inventors: Andrew C. Chu, Cupertino, CA (US); Christopher T. Campbell, San Jose, CA (US); Qingcheng Zeng, San Jose, CA (US); Kenzo Nagai, Fremont, CA (US); Isaac S. Harper, Campbell, CA (US); Donald G. Dafoe, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/273,625

(22) Filed: Feb. 12, 2019

(65) Prior Publication Data

US 2019/0190030 A1 Jun. 20, 2019

Related U.S. Application Data

(63) Continuation of application No. PCT/US2017/052413, filed on Sep. 20, 2017.

(Continued)

(51) Int. Cl.
*H01M 4/74* (2006.01)
*H01M 4/66* (2006.01)
(Continued)

(52) U.S. Cl.
CPC .............. *H01M 4/74* (2013.01); *H01M 4/668* (2013.01); *H01M 4/72* (2013.01);
(Continued)

(58) Field of Classification Search
CPC ........ H01M 4/668; H01M 4/74; H01M 2/348; H01M 10/0413; H01M 4/64–84;
(Continued)

(56) References Cited

U.S. PATENT DOCUMENTS

| 4,317,864 A | 3/1982 | Strasser |
| 4,374,186 A | 2/1983 | McCartney et al. |

(Continued)

FOREIGN PATENT DOCUMENTS

| CN | 1620735 A | | 5/2005 |
| CN | 101202355 A | * | 6/2008 |

(Continued)

OTHER PUBLICATIONS

Machine translation of CN-102005566-A (Year: 2011).*

(Continued)

*Primary Examiner* — Milton I Cano
*Assistant Examiner* — Mary G Henshaw
(74) *Attorney, Agent, or Firm* — Kilpatrick Townsend & Stockton LLP

(57) ABSTRACT

Energy storage devices, battery cells, and batteries of the present technology may include a first cell and a second cell disposed adjacent the first cell. The devices may include a stacked current collector coupled between the first cell and the second cell. The current collector may include a grid or matrix, and may include a combination of conductive and insulative materials.

8 Claims, 8 Drawing Sheets

Related U.S. Application Data

(60) Provisional application No. 62/461,535, filed on Feb. 21, 2017, provisional application No. 62/398,185, filed on Sep. 22, 2016.

(51) Int. Cl.
  *H01M 10/0585* (2010.01)
  *H01M 4/72* (2006.01)
  *H01M 10/04* (2006.01)
  *H01M 10/0525* (2010.01)
  *H01M 10/052* (2010.01)
  *H01M 4/02* (2006.01)
  *H01M 50/581* (2021.01)

(52) U.S. Cl.
  CPC ... *H01M 10/0413* (2013.01); *H01M 10/0525* (2013.01); *H01M 10/0585* (2013.01); *H01M 50/581* (2021.01); *H01M 10/052* (2013.01); *H01M 2004/029* (2013.01); *H01M 2200/106* (2013.01); *H01M 2220/10* (2013.01)

(58) Field of Classification Search
  CPC .......... H01M 50/581; H01M 10/0525; H01M 10/0585; H01M 10/052; H01M 2004/029; H01M 2200/106; H01M 2220/10
  See application file for complete search history.

(56) References Cited

U.S. PATENT DOCUMENTS

| | | |
|---|---|---|
| 4,567,119 A | 1/1986 | Lim |
| 5,162,172 A | 11/1992 | Kaun |
| 5,254,415 A | 10/1993 | Williams et al. |
| 5,367,431 A | 11/1994 | Kunishi et al. |
| 6,004,698 A | 12/1999 | Richardson et al. |
| 8,124,266 B2 | 2/2012 | Yamazaki |
| 8,153,410 B2 | 4/2012 | Jaffe |
| 8,357,469 B2 | 1/2013 | Shaffer, Ii et al. |
| 8,663,833 B2 | 3/2014 | Hosaka et al. |
| 9,142,811 B2 * | 9/2015 | Chami ............... H01M 2/26 |
| 10,916,741 B1 | 2/2021 | Dafoe et al. |
| 10,916,796 B1 | 2/2021 | Zeilinger et al. |
| 10,923,728 B1 | 2/2021 | Zeng |
| 11,018,343 B1 | 5/2021 | Dafoe et al. |
| 11,043,703 B1 | 6/2021 | Zeng et al. |
| 11,189,834 B1 | 11/2021 | Zeng |
| 11,228,074 B2 | 1/2022 | Kaye et al. |
| 11,296,351 B1 | 4/2022 | Gorer et al. |
| 11,296,361 B2 | 4/2022 | Chu et al. |
| 11,335,977 B1 | 5/2022 | Zeng et al. |
| 2002/0146620 A1 | 10/2002 | Connell |
| 2003/0027051 A1 | 2/2003 | Kejha et al. |
| 2003/0096170 A1 * | 5/2003 | Fujiwara ............... H01M 4/745 |
| | | 429/242 |
| 2003/0194605 A1 | 10/2003 | Fauteux et al. |
| 2004/0001302 A1 | 1/2004 | Sato et al. |
| 2005/0019643 A1 | 1/2005 | Sugita et al. |
| 2005/0106456 A1 | 5/2005 | Puester et al. |
| 2007/0210760 A1 | 9/2007 | Shimamura et al. |
| 2009/0023059 A1 | 1/2009 | Kinoshita et al. |
| 2009/0068531 A1 | 3/2009 | Sawa et al. |
| 2009/0087728 A1 | 4/2009 | Less et al. |
| 2009/0136832 A1 | 5/2009 | Aihara et al. |
| 2009/0233175 A1 * | 9/2009 | Kelley ............... H01M 4/668 |
| | | 429/225 |
| 2009/0297892 A1 | 12/2009 | Ijaz et al. |
| 2010/0124693 A1 | 5/2010 | Kosugi et al. |
| 2010/0134942 A1 | 6/2010 | Wang et al. |
| 2010/0285355 A1 | 11/2010 | Kozinsky et al. |
| 2011/0294007 A1 | 12/2011 | Hosaka et al. |
| 2012/0148913 A1 | 6/2012 | Chiba |
| 2012/0156552 A1 * | 6/2012 | Miyazaki ............... H01M 2/26 |
| | | 429/179 |
| 2012/0189896 A1 | 7/2012 | Zhou et al. |
| 2012/0219835 A1 | 8/2012 | Kawabe et al. |
| 2012/0263995 A1 | 10/2012 | Naito et al. |
| 2013/0065106 A1 | 3/2013 | Faust et al. |
| 2013/0089774 A1 | 4/2013 | Chami |
| 2013/0242593 A1 | 9/2013 | LoRocco et al. |
| 2013/0266823 A1 | 10/2013 | Lee |
| 2014/0127542 A1 | 5/2014 | Li et al. |
| 2014/0154542 A1 | 6/2014 | Issaev et al. |
| 2014/0178753 A1 | 6/2014 | Chu et al. |
| 2015/0037616 A1 | 2/2015 | Wyatt et al. |
| 2015/0155564 A1 | 6/2015 | Chami et al. |
| 2015/0228937 A1 | 8/2015 | Spilker |
| 2015/0311490 A1 | 10/2015 | Murase et al. |
| 2015/0325894 A1 | 11/2015 | Merriman et al. |
| 2016/0049646 A1 | 2/2016 | Fujiki et al. |
| 2016/0049679 A1 | 2/2016 | Stevens et al. |
| 2016/0093845 A1 | 3/2016 | DeKeuster et al. |
| 2016/0099456 A1 | 4/2016 | Kwon et al. |
| 2016/0099490 A1 | 4/2016 | Larsson |
| 2016/0111729 A1 | 4/2016 | Kim et al. |
| 2016/0197352 A1 | 7/2016 | Blaser et al. |
| 2016/0248113 A1 | 8/2016 | He et al. |
| 2016/0329535 A1 | 11/2016 | Moomaw et al. |
| 2016/0329606 A1 | 11/2016 | Ro et al. |
| 2017/0012331 A1 | 1/2017 | Ng et al. |
| 2017/0077545 A1 | 3/2017 | Shaffer, II et al. |
| 2017/0133689 A1 | 5/2017 | Moore et al. |
| 2017/0214057 A1 | 7/2017 | Kotik et al. |
| 2018/0013144 A1 | 1/2018 | Li et al. |
| 2018/0219227 A1 | 8/2018 | Moomaw et al. |
| 2018/0226654 A1 | 8/2018 | Ohsawa et al. |
| 2018/0316063 A1 | 11/2018 | Masel et al. |
| 2019/0036147 A1 | 1/2019 | Yuan et al. |
| 2019/0237748 A1 | 8/2019 | Shin et al. |
| 2020/0028166 A1 | 1/2020 | Tanaka et al. |
| 2020/0395594 A1 | 12/2020 | Doi et al. |

FOREIGN PATENT DOCUMENTS

| | | |
|---|---|---|
| CN | 101809801 A | 8/2010 |
| CN | 101884125 A | 11/2010 |
| CN | 102005566 A * | 4/2011 |
| CN | 102187504 A | 9/2011 |
| CN | 102272977 A | 12/2011 |
| CN | 102341948 A | 2/2012 |
| CN | 102576850 A | 7/2012 |
| CN | 103069614 A | 4/2013 |
| CN | 103165920 A | 6/2013 |
| CN | 103222098 A | 7/2013 |
| CN | 103548196 A | 1/2014 |
| CN | 103855360 A | 6/2014 |
| CN | 103904294 A | 7/2014 |
| CN | 104466191 A | 3/2015 |
| CN | 104604003 A | 5/2015 |
| CN | 107851747 A | 3/2018 |
| EP | 1125336 A1 | 8/2001 |
| EP | 1156547 A1 | 11/2001 |
| EP | 2892097 A1 | 7/2015 |
| EP | 3196955 A | 7/2017 |
| EP | 3317907 A | 5/2018 |
| EP | 3435473 A1 | 1/2019 |
| JP | 06503442 A | 4/1994 |
| JP | 07161346 A | 6/1995 |
| JP | 2002343452 A | 11/2002 |
| JP | 2003096219 A | 4/2003 |
| JP | 2005005163 A | 1/2005 |
| JP | 2006012556 A | 1/2006 |
| JP | 2007012584 A | 1/2007 |
| JP | 2009224097 A | 10/2009 |
| JP | 2011009203 A | 1/2011 |
| JP | 2011071011 A | 4/2011 |
| JP | 4857710 B2 | 1/2012 |
| JP | 2012234823 A | 11/2012 |
| JP | 2013114746 A | 6/2013 |
| JP | 2013187074 A | 9/2013 |
| JP | 5410822 B2 | 2/2014 |
| JP | 2014029818 A | 2/2014 |
| JP | 2018083957 A | 5/2018 |
| JP | 2018519646 | 7/2018 |

(56) References Cited

FOREIGN PATENT DOCUMENTS

| KR | 20130066795 A | 6/2013 | | |
|---|---|---|---|---|
| WO | 8504287 A1 | 9/1985 | | |
| WO | 9210861 A1 | 6/1992 | | |
| WO | 2010111087 A1 | 9/2010 | | |
| WO | 2016031689 A1 | 3/2016 | | |
| WO | 2017007827 | 1/2017 | | |
| WO | 2017007827 A1 | 1/2017 | | |
| WO | 2018057566 A1 | 3/2018 | | |
| WO | 2018195372 A1 | 10/2018 | | |
| WO | 2018213601 A2 | 11/2018 | | |
| WO | 2019059133 A1 | 3/2019 | | |
| WO | WO-2019184311 A | * 10/2019 | ............. | H01M 4/68 |
| WO | 2021048028 A1 | 3/2021 | | |

OTHER PUBLICATIONS

International Patent Application No. PCT/US2017/052413, "International Preliminary Report on Patentability", dated Apr. 4, 2019, 12 pages.
U.S. Appl. No. 15/962,133, "Non-Final Office Action", dated Jan. 21, 2020, 37 pages.
PCT/US2017/052413, "International Search Report and Written Opinion", dated Feb. 1, 2018, 19 pages.
PCT/US2017/052413, "Invitation to Pay Additional Fees", dated Dec. 8, 2017, 14 pages.
U.S. Appl. No. 15/742,009, "Restriction Requirement", dated Jun. 11, 2019, 8 pages.
Europe Patent Application No. 16738994.9, "Communication Pursuant to Rules 161(1) and 162 EPC", dated Mar. 23, 2018, 3 pages.
Japan Patent Application No. 2018-500449, "Office Action", dated Jan. 21, 2019, 12 pages.
PCT/US2016/041151, "International Preliminary Report on Patentability", dated Jan. 18, 2018, 8 pages.
PCT/US2016/041151, "International Search Report and Written Opinion", dated Aug. 25, 2016, 10 pages.
PCT/US2018/028472, "International Search Report and Written Opinion", dated Jul. 27, 2018, 13 pages.
PCT/US2018/033218, "International Search Report and Written Opinion", dated Nov. 16, 2018, 13 pages.
Korean Patent Application No. 10-2018-7000263, "Office Action", dated Feb. 28, 2019, 5 pages.
Korea Patent Application No. 10-2018-7000263, "Office Action", dated Sep. 27, 2019, 16 pages.
PCT/US2018/028472, "International Preliminary Reporton Patentability", dated Oct. 31, 2019, 10 pages.
U.S. Appl. No. 15/742,009, "Non-Final Office Action", dated Nov. 15, 2019, 14 pages.
PCT/US2018/033218, "International Preliminary Report on Patentability", dated Nov. 28, 2019, 9 pages.
U.S. Appl. No. 16/049,250, "Non-Final Office Action", dated Apr. 8, 2020, 8 pages.
U.S. Appl. No. 16/263,890, "Non-Final Office Action", dated Jun. 16, 2020, 9 pages.
Chinese Patent Application No. 201680039891.9, "Office Action", dated Jun. 10, 2020, 18 pages.
U.S. Appl. No. 15/962,133, "Final Office Action", dated Jul. 7, 2020, 23 pages.
U.S. Appl. No. 15/742,009, "Final Office Action", dated Aug. 19, 2020, 13 pages.
U.S. Appl. No. 16/108,522, "Non-Final Office Action", dated Sep. 9, 2020, 10 pages.
European Patent Application No. 16738994.9, "Notice of Decision to Grant", dated Sep. 24, 2020, 2 pages.
Korean Patent Application No. 10-2018-7000263, "Notice of Decision to Grant", dated Apr. 8, 2020, 2 pages.
Chinese Patent Application No. 201680039891.9, "Office Action", dated Jan. 6, 2020, 23 pages.
Japan Patent Application No. 2018-500449, "Notice of Decision to Grant", dated Nov. 18, 2019, 2 pages.
U.S. Appl. No. 16/108,498, "Non-Final Office Action", dated Apr. 30, 2020, 28 pages.
U.S. Appl. No. 16/007,534, "Non-Final Office Action", dated May 5, 2020, 47 pages.
U.S. Appl. No. 16/038,865, "Non-Final Office Action", dated Nov. 6, 2020, 13 pages.
U.S. Appl. No. 16/049,250, "Notice of Allowance", dated Oct. 7, 2020, 7 pages.
U.S. Appl. No. 16/108,503, "Non-Final Office Action", dated Oct. 2, 2020, 11 pages.
U.S. Appl. No. 16/263,890, "Notice of Allowance", dated Oct. 23, 2020, 8 pages.
U.S. Appl. No. 16/683,088, "Non-Final Office Action", dated Sep. 2, 2021, 10 pages.
U.S. Appl. No. 16/683,091, "Non-Final Office Action", dated Aug. 18, 2021, 22 pages.
Boeva et al., "Soluble and Highly Ionically Conducting Interpolyelectrolyte Complexes Prepared Via Chemical Template Polymerization of Aniline in the Presence of Perfluorinated Polysulfonic Acid", The Royal Society of Chemistry; vol. 4, 2014, pp. 56677-56681.
Thuc,"Study on Synthesis and Characterization of Anion Exchange Membrane Based on Poly (Vinyl Alcohol) Modified by Freeradical Polymerization", International Journal of Electrochemical Science; vol. 15, 2020, pp. 8190-8199.
U.S. Appl. No. 16/683,088, "Final Office Action", dated Oct. 12, 2021, 12 pages.
U.S. Appl. No. 16/683,088, "Notice of Allowance", dated Nov. 22, 2021, 8 pages.
China Patent Application No. 201780053071.X, "Office Action", dated Nov. 2, 2021, 20 pages.
U.S. Appl. No. 15/742,009, "Non-Final Office Action", dated Aug. 3, 2021, 16 pages.
U.S. Appl. No. 16/038,865, "Notice of Allowance", dated Aug. 13, 2021, 8 pages.
U.S. Appl. No. 15/962,133, "Notice of Allowance", dated Feb. 9, 2021, 8 pages.
U.S. Appl. No. 16/038,865, "Final Office Action", dated Jun. 1, 2021, 7 pages.
U.S. Appl. No. 16/108,498, "Non-Final Office Action", dated May 17, 2021, 21 pages.
U.S. Appl. No. 16/108,503, "Final Office Action", dated May 25, 2021, 9 pages.
U.S. Appl. No. 16/108,522, "Notice of Allowance", dated Feb. 26, 2021, 8 pages.
U.S. Appl. No. 16/522,475, "Non-Final Office Action", dated May 17, 2021, 17 pages.
Weng, et al., "Three-Electrolyte Electrochemical Energy Storage Systems Using Both Anion- and Cation-Exchange Membranes as Separators", Energy, vol. 167, Jan. 15, 2019, pp. 1-32.
PCT/US2020/060350, "International Search Report and Written Opinion", dated Mar. 12, 2021, 12 pages.
PCT/US2020/060348, "International Search Report and Written Opinion", dated Mar. 12, 2021, 9 pages.
China Patent Application 201780053071.X,"Office Action", dated Apr. 16, 2021, 21 pages.
U.S. Appl. No. 15/742,009 , Notice of Allowance, dated Dec. 24, 2021, 12 pages.
U.S. Appl. No. 16/108,498 , "Corrected Notice of Allowability", dated Mar. 9, 2022, 2 pages.
U.S. Appl. No. 16/108,498 , Notice of Allowance, dated Feb. 24, 2022, 11 pages.
U.S. Appl. No. 16/108,503 , Non-Final Office Action, dated Feb. 2, 2022, 9 pages.
U.S. Appl. No. 16/658,442 , Non-Final Office Action, dated Feb. 22, 2022, 16 pages.
U.S. Appl. No. 17/014,637 , Non-Final Office Action, dated Feb. 24, 2022, 20 pages.
International Application No. PCT/US2021/049023 , International Search Report and Written Opinion, dated Dec. 22, 2021, 11 pages.
U.S. Appl. No. 15/742,009, "Non-Final Office Action", dated Nov. 30, 2020, 13 pages.

(56) References Cited

OTHER PUBLICATIONS

U.S. Appl. No. 16/007,534, "Notice of Allowance", dated Nov. 18, 2020, 7 pages.
U.S. Appl. No. 16/108,498, "Final Office Action", dated Dec. 9, 2020, 25 pages.
China Patent Application No. 201680039891.9, "Office Action", dated Oct. 27, 2020, 8 pages.
Non-Final Office Action issued in U.S. Appl. No. 16/613,094, dated Aug. 19, 2022 in 16 pages.
Final Office Action issued in U.S. Appl. No. 16/658,442, dated Aug. 16, 2022 in 15 pages.
Non-Final Office Action issued in U.S. Appl. No. 17/014,637, dated Jul. 25, 2022 in 20 pages.
Non-Final Office Action issued in U.S. Appl. No. 17/014,768, dated Jun. 30, 2022 in 10 pages.
Office Action issued in China Application No. CN201780053071.X, dated Mar. 18, 2022 in 15 pages.
Office Action issued in China Application No. CN201880026199.1, dated Mar. 3, 2022 in 8 pages.
Application No. PCT/US2020/060348, International Preliminary Report on Patentability, dated May 27, 2022, 8 pages.
International Preliminary Report on Patentability issued in PCT Application No. PCT/US2020/060350, dated May 27, 2022 in 8 pages.
China Patent Application No. 201780053071.X, "Office Action", dated Aug. 30, 2022, 17 pages.
China Patent Application No. 202011204662.2, "Office Action", dated Aug. 26, 2022, 14 pages.
China Patent Application No. 202011211648.5, "Office Action", dated Aug. 19, 2022, 12 pages.
U.S. Appl. No. 16/108,503, "Final Office Action", dated Oct. 12, 2022, 8 pages.
U.S. Appl. No. 17/014,550, "Notice of Allowance", dated Oct. 18, 2022, 10 pages.
U.S. Appl. No. 17/014,717, "Non-Final Office Action", dated Oct. 13, 2022, 14 pages.
U.S. Appl. No. 17/353,059, "Non-Final Office Action", dated Nov. 1, 2022, 8 pages.

\* cited by examiner

CURRENT COLLECTOR FOR A STACKED BATTERY DESIGN

CROSS REFERENCES TO RELATED APPLICATION

This application is a continuation of International Patent Application No. PCT/2017/052413, filed Sep. 20, 2017, which claims the benefits of U.S. Provisional Patent Application Ser. No. 62/398,185, filed Sep. 22, 2016, and U.S. Provisional Patent Application Ser. No. 62/461,535, filed Feb. 21, 2017, the entire disclosures of which are hereby incorporated by reference for all purposes.

TECHNICAL FIELD

The present technology relates to batteries and battery components. More specifically, the present technology relates to current collector designs.

BACKGROUND

In battery-powered devices, penetration of the battery housing and interior cells may occur during abuse conditions. A test for this type of device condition involves a nail penetration in which the nail punctures interior components of the battery. Improved designs for testing outcomes are needed.

SUMMARY

The present technology relates to energy storage devices, including battery cells and batteries, which may include lithium-ion batteries having a variety of shapes including stacked cells, which may be or include bipolar batteries or mono cell stacked batteries, for example. These devices may include current collectors configured based on a z-direction transmission of current through the cell components, as compared to in-plane electrical transmission across current collectors. The current collectors may include a host of features and material configurations as will be described throughout the disclosure.

Energy storage devices, battery cells, and batteries of the present technology may include a first cell and a second cell disposed adjacent the first cell. The devices may include stacked batteries having adjoining current collectors. The devices may include a stacked current collector coupled between the first cell and the second cell. The current collector may include a grid or matrix, and may include a combination of conductive and insulative materials. In embodiments the stacked current collector may include a conductive material disposed within the insulative material.

The stacked current collector may prevent or substantially prevent in-plane current flow through the stacked current collector in embodiments, or may have increased resistivity in-plane. For example, an in-plane resistivity of the stacked current collector may be greater than or about 0.005 ohm-meters across a length of the stacked current collector. In embodiments, the stacked current collector may include a first layer in contact with the first cell, and a second layer in contact with the second cell. Additionally, an interface between the first layer and the second layer may be fluid impermeable.

In some embodiments, the first layer and the second layer may each include an insulative grid having a conductive material disposed within the insulative grid. The conductive material disposed within the insulative grid of the first layer and the second layer may be a similar material, and in embodiments, the conductive material may be or include stainless steel. In some embodiments the conductive material may include a conductive composite material. Additionally, the stacked current collector may further include a coupling material positioned about a perimeter of the insulative grid.

The present technology also encompasses single-cell and multi-cell batteries. In embodiments, the multi-cell batteries may include a first cell, and the first cell may have a first current collector, a first anode, a first cathode, and/or a second current collector. The multi-cell batteries may also include a second cell, and the second cell may have a third current collector, a second anode, a second cathode, and/or a fourth current collector. In embodiments, the second current collector and the third current collector may be coupled with one another across a surface of each of the second current collector and the third current collector. Additionally, each current collector may include a conductive grid. In embodiments at least one current collector may also include a current interrupt component.

The conductive grid of each current collector of the multi-cell battery may be disposed in an insulative material. In some embodiments the current interrupt component may be or include a positive temperature coefficient ("PTC") material disposed with the insulative material. The PTC material may be configured to expand at a predetermined temperature and separate the current collector from an adjacent component layer. In some embodiments, the first current collector and the third current collector may include a first material in the conductive grid. Additionally, the second current collector and the fourth current collector may include in the conductive grid a second material different from the first. For example, the first material may be or include aluminum and the second material may be or include stainless steel. In some embodiments the conductive grid of each current collector may be the same or a similar material.

The current interrupt component of the multi-cell batteries may include a plurality of regions of the at least one conductive grid. In embodiments, the plurality of regions may be characterized by reduced dimensions in comparison to other regions of the conductive grid or other components. The grid may include a plurality of crossed grid members. In some embodiments the plurality of regions may include parallel grid members characterized by a grid member thickness less than a grid member thickness of parallel crossing grid members. Additionally, the grid may include a plurality of crossed grid members, and the plurality of regions may include portions of the grid members located between grid nodes. The current interrupt component may also be or include a non-resettable positive temperature coefficient ("PTC") material disposed between the second current collector and the third current collector. In embodiments the PTC material may be configured to expand at a predetermined temperature to electrically decouple the first cell and the second cell.

Embodiments of the present technology may also encompass batteries. Exemplary batteries may include a first cell that may include a first current collector coupled with a first cathode material. The first cell may also include a second current collector coupled with a first anode material. Exemplary batteries may also include a second cell that may include a third current collector coupled with a second cathode material. The second cell may also include a fourth current collector coupled with a second anode material. In some embodiments the second current collector and the third current collector may be coupled with one another. Additionally, each current collector of the first cell and the second cell may be or include an insulative matrix containing a conductive material within interstices of the insulative matrix.

The insulative matrix in exemplary batteries may include a polymer matrix. In some embodiments, the conductive material may include at least one material selected from the group consisting of silver, aluminum, copper, stainless steel, and a carbon-containing material. The conductive material may include alternative conductive materials as well. In embodiments the resistivity of each current collector may be greater than or about 0.001 ohm-meters. In some exemplary batteries each of the current collectors may further include a coupling material positioned about a perimeter of the current collector. The coupling material may include a polymeric compound, and in embodiments the polymeric compound may be or include a polyolefin.

Such technology may provide numerous benefits over conventional technology. For example, the present devices may aid in failure events in which the integrity of the device is breached. Additionally, the designs may allow extended scaling of batteries for use in larger devices and systems. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

Figure 1:
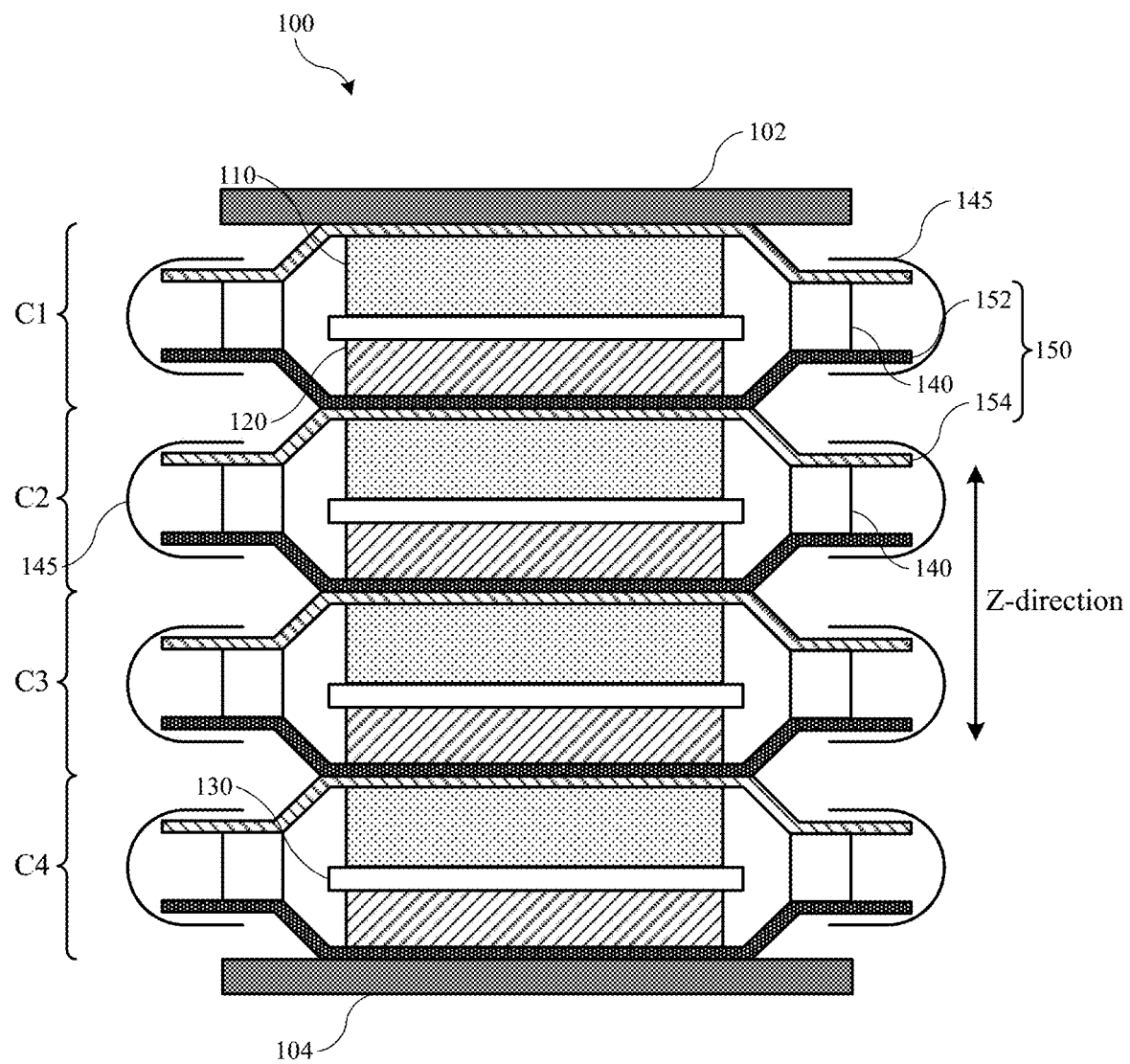
FIG. 1 shows a schematic cross-sectional view of an energy storage device according to embodiments of the present technology.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include additional or exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Batteries, battery cells, and more generally energy storage devices, may be made from a host of materials. In some conventional battery designs, such as in some lithium-ion batteries, the current of each cell is conducted across current collectors and through tabs at their exterior. During a discharging operation, current entering the device at the anode typically enters through tabs on anode current collectors, and current leaving the device at the cathode typically leaves through tabs on cathode current collectors. At the anode, for example, the current must enter at the tab of what may be a copper current collector and then distribute across the entire current collector. Put another way, the current must distribute in-plane or along the XY-axes of the current collector, which is often in dimensions of the millimeter range or more. Because of this relatively large distance and area distribution on each current collector, the current collectors are often sought to be as conductive as possible, because as resistivity increases performance may decrease, and additional heat may be generated in the device. This is often why highly conductive materials, such as aluminum and copper, are used in many conventional current collector designs.

In stacked batteries, cells are stacked in series, but electrons flow through plane with respect to the current collector and cells, or along a normal or Z-axis from the current collector. Stacked batteries often include at least one current collector that operates both as the anode of one cell and the cathode of a paired cell. Another design called a mono cell stack, or MCS, may have similar operational characteristics of a stacked battery, but each cathode and anode have separate current collectors.

In terms of distance for stacked batteries, the electrons and current traverse a distance that is orthogonal to the individual layers. Accordingly, with the current collector, the electronic flow occurs across the thickness of the current collector, which may be on the order of several microns or less, as opposed to across the length/width of the current collector, which may be on the order of millimeters or more. In this way, conductivity of the current collector materials can be less of an issue in terms of battery performance due to the small distances traveled, and associated resistances, to pass electrons and current through the device. Indeed, in some cases the entire thickness of the stacked cells of the battery through which current flows may be less than the distance across a single current collector in conventional designs.

As devices increase in size, or power requirements increase, batteries may be scaled to provide adequate power. Battery testing may involve one or more tests that breach the integrity of the cell, such as by nail penetration, which may cause device failure as well as short circuiting. When conventional batteries are breached in such a way, the short circuit may breach any number of cells, and being coupled in series regardless of the extent of breach, the current from the entire device may travel to the short. Current flow generates heat both in operation and in short circuiting, although this heat generation may be much greater during a short-circuit event based on the degree of transmission. This generation may be greater still for larger batteries holding more charge, which can dissipate at a high rate across components. Such a short may generate enough heat to risk integrity of the system.

Conventional battery designs have struggled with controlling heat generation from these and other possible failure events while attempting to scale batteries to larger sizes, which can increase the extent of heat generation from fault events. The present technology may overcome these conventional issues with current collector designs that provide isolation or control of failure events. By isolating a breach, or controlling the extent or rate of electronic flow to a breach, the present technology may reduce heat generation during device failure conditions.

Although the remaining portions of the description will routinely reference lithium-ion batteries, it will be readily understood by the skilled artisan that the technology is not so limited. The present designs may be employed with any number of battery or energy storage devices, including other rechargeable battery types as well as non-rechargeable designs. Moreover, the present technology may be applicable to batteries and energy storage devices used in any number of technologies that may include, without limitation, phones and mobile devices, handheld electronic devices, laptops and other computers, appliances, heavy machinery, transportation equipment including automobiles, water-faring vessels, air travel equipment, and space travel equipment, as well as any other device that may use batteries or benefit from the discussed designs. Accordingly, the disclosure and claims are not to be considered limited to any particular example discussed, but can broadly be utilized with any number of devices that may exhibit some or all of the electrical or chemical characteristics of the discussed examples.

FIG. 1 depicts a schematic cross-sectional view of an energy storage device according to embodiments of the present technology. The energy storage devices may include a single current collector or coupled current collectors. Additionally, the described devices may similarly operate by electronic flow through the structure in a Z-direction through individual cells as opposed to via tabbed current collectors as described above for conventional batteries.

As illustrated, the stacked battery 100 may include a stack of electrochemical cells C1, C2, C3, and C4 between end plates 102 and 104. End plates 102 and 104 may be metal current collector plates, which can serve both electrical and mechanical functions. In some embodiments, end plates 102 and 104 can be support plates that form part of an external housing of the stacked battery. End plates 102 and 104 may also provide mechanical support within a housing of the stacked battery. Some or all of the support plates may be electrically conductive, and there may be a terminal within the support plate that is electrically connected to the end plate. In embodiments an additional plate similar to end plates 102 and 104 may be disposed within the stack of cells, such as between two cells. This configuration including an additional plate may provide structural rigidity, and the additional plate may also preform electronic functions similar to end plates 102, 104. End plates 102 and 104 may act as positive and negative terminals of the battery. The cells may pass current in the Z-direction through individual cells to the end plates, which may transfer current in any direction across the plate and from the battery.

The stack of electrochemical cells may include any number of electrochemical cells depending on the selected voltage for the stacked battery 100, along with the individual voltage of each individual electrochemical cell. The cell stack may be arranged with as many or as few electrochemical cells in series as desired, as well as with intervening plates for support and current transfer. The cells C may be positioned adjacent, e.g. abutting, one another in some configurations. Each electrochemical cell C may include a cathode 110 and an anode 120, where the cathode 110 and anode 120 may be separated by separator 130 between the cathode and anode. Between the anode 120 of cell C1 and the cathode of adjacent cell C2 may be a stacked current collector 150. The stacked current collector 150 may form part of C1 and C2. On one side, stacked current collector 150 may be connected to the seal 140 of C1 and connected on an opposing side to the seal 140 of C2.

In some embodiments, as shown in FIG. 1, stacked current collector 150 may include a first metal layer 152 and a second metal layer 154. As shown in the figure, in some embodiments the first metal layer 152 and second metal layer 154 can be different materials. In some embodiments, the first metal layer 152 may be a material selected based on the potential of the anode 120, such as copper or any other suitable metal. The second metal layer may be a material selected based on the potential of the cathode 110, such as aluminum or other suitable metals. In other words, the materials for the first and second metal layers can be selected based on the materials that are selected for the anode and cathode active materials.

The first and second metal layers can be made of any material known in the art. For example, copper, aluminum, or stainless steel may be used. In instances where one or more metal layers have higher impedance than other conductive metals, the metals used in the first and second metal layer can be the same or different. The materials selected for the anode and cathode can be any suitable battery materials. For example, the anode material can be silicon, graphite, carbon, a tin alloy, a lithium containing material, such as lithium titanium oxide (LTO), or other suitable materials that can form an anode in a battery cell. Additionally, for example, the cathode material can be a lithium-containing material. In some embodiments, the lithium-containing material can be a lithium metal oxide, such as lithium cobalt oxide, lithium manganese oxide, lithium nickel manganese cobalt oxide, lithium nickel cobalt aluminum oxide, or lithium titanate, while in other embodiments, the lithium-containing material can be a lithium iron phosphate, a lithium metal polymer, or other suitable materials that can form a cathode in a battery cell.

The first and second metal layers may have any suitable thickness that allows for a hermetic seal to be formed and provides suitable mechanical stability to prevent failure, such as breakage of the layers, during anticipated usage of the stacked battery. Additionally, the thickness of the metal layers can be sufficiently thin to allow for bending and flexing in the separation region to accommodate expansion anticipated during cycling of the stacked battery, including, for example, up to 10% expansion in the z-direction.

Figure 2:
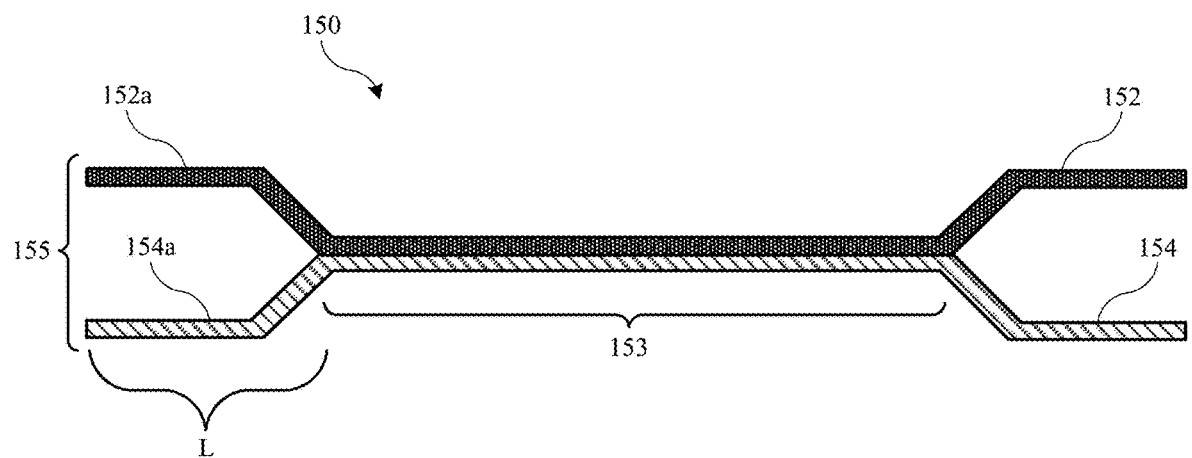
FIG. 2 shows a schematic cross-sectional view of a current collector according to embodiments of the present technology.

Turning to FIG. 2, the stacked current collector 150 may have a connection region 153 where the first metal layer 152 and second metal layer 154 may be connected, and a gap region 155 at the peripheral ends of the collector 150. In the connection region 153, the first metal layer and second metal layer may be joined to be electrically-conductive. In some embodiments, the first metal layer and second metal layer may be directly connected, while in other embodiments the first metal layer and second metal layer may be indirectly connected via a conductive material. To form the connection region 153, the first metal layer 152 and the second metal layer 154 may be laminated together. Additionally, the connection region 153 may be created by welding the first metal layer 152 and the second metal layer 154 together. The connection region 153 may also be created by using an adhesive, which is electrically conductive, between the first metal layer 152 and the second metal layer 154. In other embodiments, the connection region 153 may be created by the wetting that can occur between the materials of the first metal layer 152 and the second metal layer 154.

In the gap region 155, the peripheral ends of the first layer 152 and the second layer 154 may be spaced apart and moveable relative to each other. As such, there may be a separation distance between the first and second metal layers, which may increase as the electrochemical cell swells. In some embodiments, the spaced apart peripheral ends of the first metal layer 152 and the second metal layer 154 may be of a length that is sufficient to accommodate an anticipated expansion of the individual electrochemical cells of the stacked battery during cycling of the battery. The peripheral ends 152a and 154a may have a length L, as shown in FIG. 2, which may be long enough that up to or at least about 10% expansion in the z-direction can be accommodated.

As shown in FIG. 1, each cell C1, C2, C3, and C4, also includes a seal 140 to electrochemically isolate the electrochemical cells from each other. Thus, each cathode-anode pair may be electrochemically sealed and isolated from neighboring electrochemical cells. Because the metal layers 152 and 154 may be separated at the peripheral ends, separate seals 140 can be formed on opposing sides, such as a top and bottom, of the stacked current collector 150.

The seal material may be able to bond with the first and second metal layers of the stacked current collector to prevent electrolyte leakage. The seal material may be a polymer, an epoxy, or other suitable material that can bond with first and second metal layers to create a hermetic seal. In some embodiments, the polymer may be polypropylene, polyethylene, polyethylene terephthalate, polytrimethylene terephthalate, polyimide), or any other suitable polymer that may bond with the first and second metal layers of the stacked current collector to form a hermetic seal and may also provide resistance to moisture impedance. The electrolyte may be a solid, a gel, or a liquid in embodiments. The seal may electrochemically isolate each electrochemical cell by hermetically sealing the cell, thereby preventing ions in the electrolyte from escaping to a neighboring electrochemical cell. The seal material may be any material providing adequate bonding with the metal layers such that the hermetic seal may be maintained through a predetermined period of time or battery usage.

The separator may be soaked with the electrolyte, such as a fluid electrolyte or gel electrolyte, to incorporate the electrolyte into the stacked battery. Alternatively, a gel electrolyte may coat the separator. In still further alternatives, a gel electrolyte may coat the first metal layer and/or second metal layer before combination. Additionally, the electrolyte may be blended with particles of electrode active material. In various embodiments, incorporating the electrolyte into the components of the stacked battery may reduce degassing in the stacked battery. In variations that include a flexible seal, the stacked battery may accommodate gas resulting from degassing. Moreover, manufacture of the stacked battery may not require a separate electrolyte fill step.

The individual electrochemical cells may be formed in any suitable manner. In some embodiments, the cathode 110, the anode 120, and the separator 130 may be preassembled. A first metal layer 152 may then be connected to the anode while a second metal layer 154 may be connected to the cathode to create a cell. The seal material may be disposed between the first metal layer 152 and the second metal layer 154 to form seals 140. Finally, the peripheral ends of the sealed electrochemical cell may be further taped to frame the cell. Tapes 145 may be disposed around the outer perimeter of the metal layers and seals. The tape 145 may be substituted with ceramic or polymeric materials. Tape 145 may be included for various reasons including to prevent shorting, provide improved electrochemical or chemical stability, and to provide mechanical strength.

Figure 3:
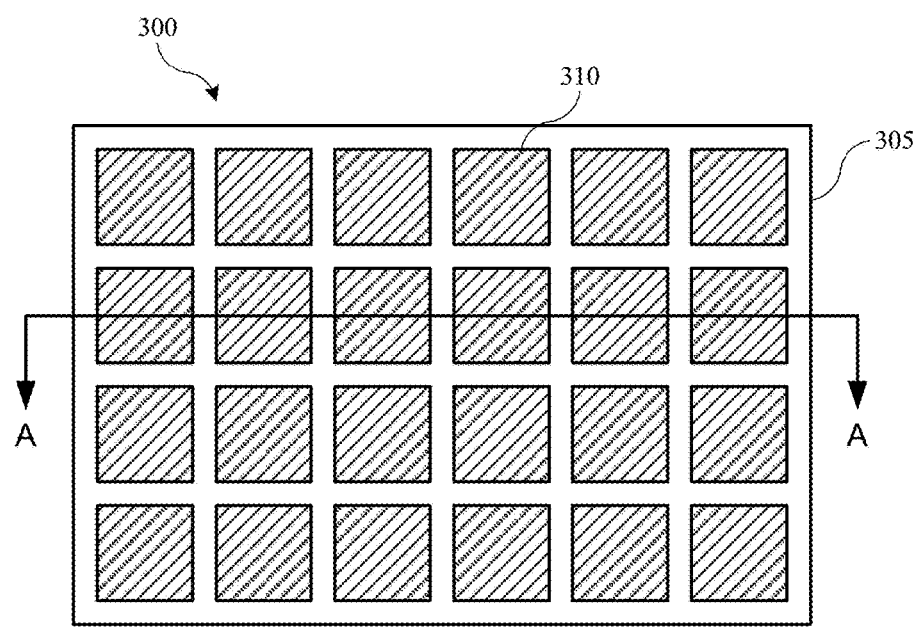
FIG. 3 shows a top plan view of a portion of a current collector according to embodiments of the present technology.

FIG. 3 illustrates a top plan view of a portion of an exemplary current collector 300 according to embodiments of the present technology, and may represent a portion of a current collector within, for example, connection region 153 as previously described. The current collector 300 may be a stacked current collector, or two connected current collectors, and may be coupled between a first cell and a second cell of a stacked battery. As illustrated, current collector 300 may include a grid 305, which in embodiments may be an insulative grid. Current collector 300 may additionally include a conductive material 310 disposed within the insulative grid.

The insulative grid may have an electrode active material in contact with the surface of the grid, which may be a cathode material 110 or an anode material 120 as previously described. The current collector 300 may be a specific stacked current collector and have an anode active material in contact with one surface of the current collector 300, as well as a cathode active material in contact with an opposite surface of the current collector. Additionally, the current collector 300 may be utilized in a stacked battery design as previously described, in which it may be positioned proximate another current collector from an adjacent cell.

The configuration of current collector 300 may further affect electronic flow through the current collector. As previously noted, batteries such as stacked batteries, including bipolar and MCS batteries, may direct current flow through the cell layers, whereas some conventional designs flow current across collectors and through tabs from each cell, which may include a bus bar coupling the tabs. Accordingly, in stacked batteries, as flow proceeds from an active material layer through the current collector 300, conductive material 310 may maintain conductivity to the following layer. Insulative grid 305 may substantially, essentially, or fully limit or prevent in-plane conductivity or current flow across the current collector 300. Although the insulative grid 305 may affect uniformity of current flow, this effect may be marginal or prevented by the cell design which may provide substantially or fully uniform conductivity from the active material layer. Accordingly, insulative grid 305 may have a negligible effect on cell performance, while providing increased short-circuit protection as described further below.

During a nail penetration or other abusive event in which a cell is breached, insulative grid 305 may fully limit the breach to the surrounding regions of conductive material 310. By limiting flow across the current collector 300, such as in the XY-plane, a short-circuiting event may be confined. It is to be understood that such an event may likely cause a full failure of the battery, however, the full failure may be controlled to limit side effects of such failure events. For the ease of understanding, the following description will provide a brief explanation of the difference in outcome from a penetration event of a conventional battery design against the design including current collector 300. Although the description relates to a nail penetration test as often performed in battery abuse testing, it is to be understood that the examples may cover any type of penetration or breaching event in which a short circuit may occur.

Figure 4A:
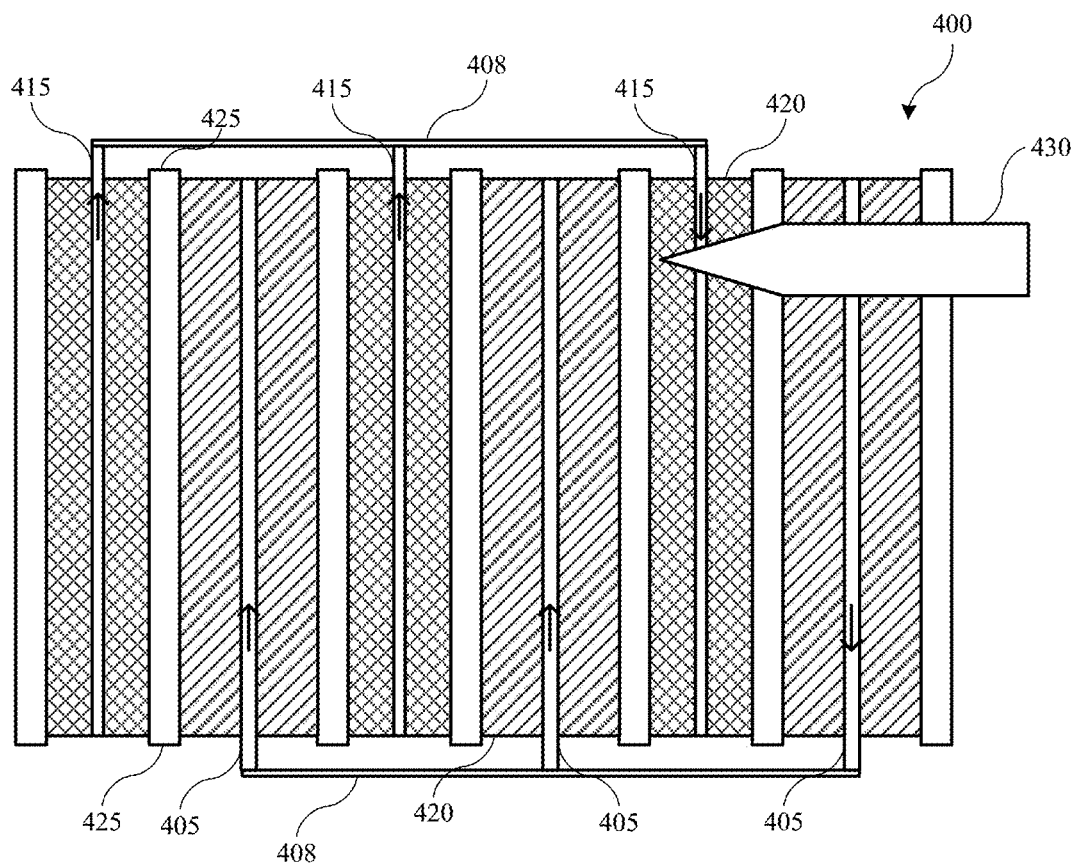
FIG. 4A shows a schematic cross-sectional view of a battery during a fault event according to embodiments of the present technology.

FIG. 4A displays a cross-sectional view of a conventional battery 400 including foil current collectors. The individual cells of the battery may include cathode current collector 405, and cathode active material 410. The cells may also include anode current collector 415, and anode active material 420. Finally, the battery 400 may have separators 425 between the electrodes. The anode and cathode current collectors 415, 405 include tab portions extending from the collectors joined by bus bars 408. In other designs, the tabs are coupled directly together with tabs of the same potential.

In such a conventional battery, the anode current collector 415 may be copper, and may be a uniform film across the cell. Similarly, the cathode current collector 405 may be aluminum, and also may be a uniform film across the cell. Were a failure event such as a nail penetration 430 through the cell to occur, a short circuit would form at the site of the nail penetration, drawing surrounding current. However, conventional designs couple the anode current collectors 415 together and couple the cathode current collectors 405 together. Because of this coupling, and the highly conductive material used for the current collectors, the entire battery may discharge towards the short circuit. Current would effectively proceed across the current collector to the short at a heightened rate, which would produce a concomitant temperature increase at the site, and across the cell. Because of the high conductivity of the materials included in the battery, the short may occur quickly, which can thereby cause a similarly expedient temperature rise, which can lead to thermal runaway within the battery. Additionally, the larger the battery, or the larger the number of cells, the more current may be discharged in such an event, and the more heat generated.

Figure 4B:
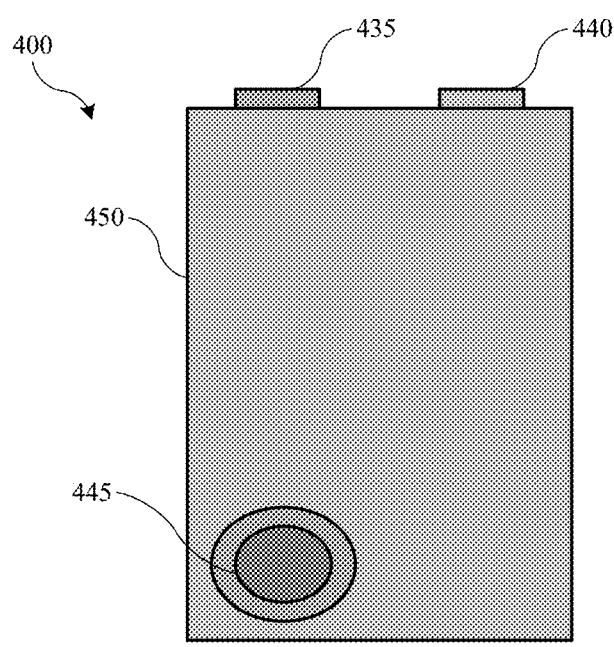
FIG. 4B illustrates a temperature profile of a top plan view of a battery during a failure event from nail penetration according to embodiments of the present technology.

FIG. 4B illustrates a temperature profile of a top plan view of battery 400 during a failure event from nail penetration. The figure is included to illustrate the accompanying temperature effect of the event across the cathode tab and current collector. As shown, battery 400 includes a cathode tab 435, which may be coupled cathode tabs from several cells. The battery 400 also includes an anode tab 440, which may be coupled anode tabs from several cells. The tabs are shown in FIG. 4A extending from opposite sides of the cell for ease of description, although in many cell designs the tabs are located on the same end of the battery as shown in FIG. 4B. The area of the puncture and short circuit 445 is illustrated as well as a view of a current collector 450 through which the puncture has occurred. As illustrated, the temperature profile relates to the current flow within the battery. The short circuit allows significant current to flow through the tabs and current collector layers, causing heat to build up at the site of the puncture 445 and short circuit, as well as at the tabs 435 where the current from coupled cells may flow.

The amount of flow during the short circuit may be related to the number of cells coupled together and the architecture of the cell, however, the flow may reach well over 100 Ah/m$^2$, and result in temperature increases of several hundred degrees or more. This may cause reactions to occur within the cell that are exothermic in nature, furthering the failure event, and potentially causing a loss of integrity of the device, and potentially other effects related to such a failure.

The current collector foils of battery 400 are unlikely to limit such a failure event. Typical foils of copper and aluminum have resistivity characteristics of roughly $1.7 \times 10^{-8}$ and $2.7 \times 10^{-8}$, respectively. Because of the lateral dimensions of the foils across which current must flow in normal operation, materials of such resistivity are used to limit the reduction in capacity of the battery. Were more resistive materials used, not only would the capacity of the battery be reduced, but the increased impedance would additionally reduce the speed of charging and increase the heating during charge and discharge. Accordingly, the direction of improvement for many such batteries, especially when scaling, is to reduce resistance of flow across the current collectors to, directly and indirectly, increase capacity and power. However, such accommodations also increase the charge transfer during discharge events such as short circuit, which can cause complete device failures.

By utilizing current collectors designed to facilitate through-plane current flow while reducing in-plane current flow, the distance of electronic travel may be several orders of magnitude less than designs that direct electronic flow from individual cells across current collectors and off tabs. Accordingly, for some stacked cell designs, maintaining certain thresholds of conductivity in the current collectors to limit the effect on capacity and operation may no longer be an issue. As the distance of electronic travel from each cell decreases, the resistivity associated with electronic travel decreases as well. Thus, design modifications such as those identified and described in relation to the present technology may affect failure and abuse tolerances.

Figure 5A:
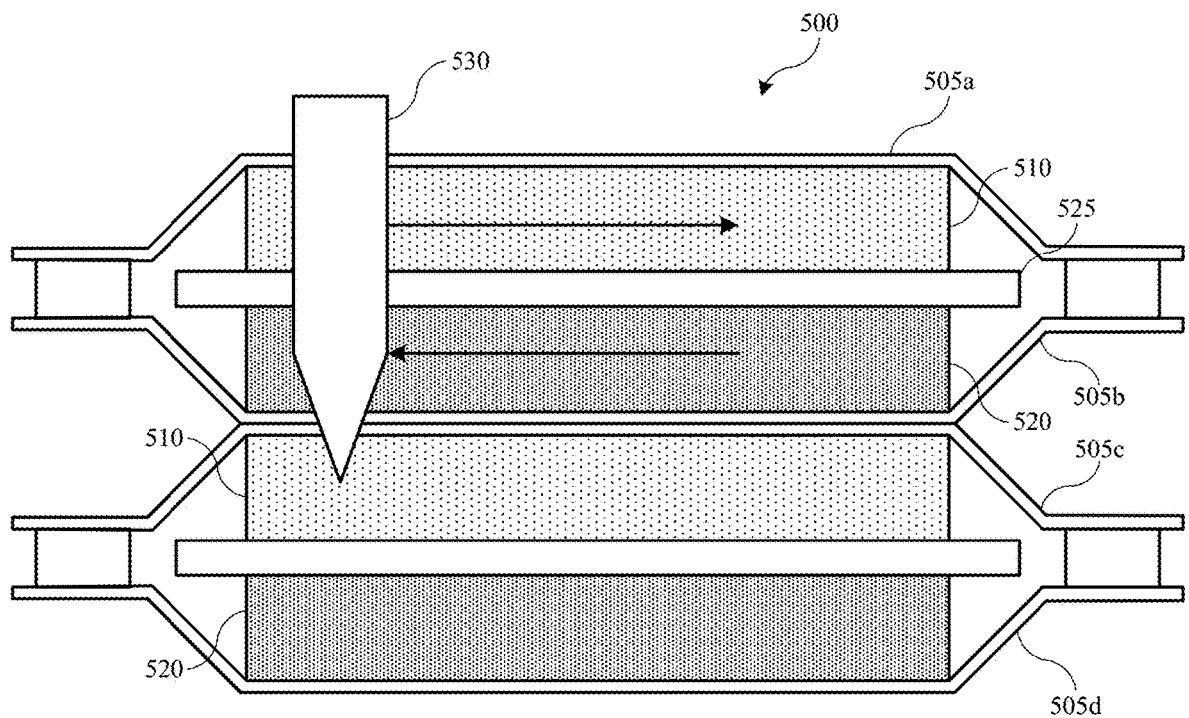
FIG. 5A shows a schematic cross-sectional view of a portion of a stacked battery during a fault event according to embodiments of the present technology

FIG. 5A shows a schematic cross-sectional view of a portion of a stacked MCS battery 500 during a fault event according to the present technology. Battery 500 may include some or all components of battery 100, for example. Battery 500 illustrates two cells according to the present technology, which may include a plurality of current collectors 505a-d, as well as a cathode material 510 and an anode material 520. Each cell may also include a separator 525 between the anode and cathode active materials. The current collectors of battery 500 may be current collectors according to FIG. 3 as previously described, although it is to be understood that the current collectors described elsewhere in the present disclosure may be similarly used based on the properties they provide.

The figure also shows a short circuit caused by a nail penetration 530, which may short across the cell. Complete failure of the battery may occur, however, effects associated with a failure event may be prevented. Upon a short circuit within the device, current may be prevented from flowing through the current collectors 505 in plane, or may be afforded reduced flow in plane. For example, with the insulative grid design, XY-plane current flow may be essentially prevented in embodiments, or substantially reduced. Additionally, normal operation of such a cell design may provide current flow in the Z-direction across components of the cell. Thus, when the short-circuit occurs, current flow will still occur through each component towards the area of the short circuit, but such current flow may be at a level that prevents substantial heat generation in the device.

For example, resistivity of active materials in the cell may be orders of magnitude higher than copper and aluminum. When the short-circuit occurs, the battery may still fully discharge, but the flow profile may be different within the battery. Instead of the flow of current across highly conductive current collectors and tabs, flow may proceed in the Z-direction through the material layers of the cell towards the short. Because each current collector may not be coupled with one another via tabs, the current flow may be substantially less than 100 Ah/m$^2$, and may be less than or about 50 Ah/m$^2$, less than or about 30 Ah/m$^2$, less than or about 20 Ah/m$^2$, less than or about 10 Ah/m$^2$, less than or about 5 Ah/m$^2$, or less in embodiments. At such levels of current flow, the temperature may increase slightly during the fault-induced discharge, but the temperature within the device may be well within normal operating tolerances for the device.

Figure 5B:
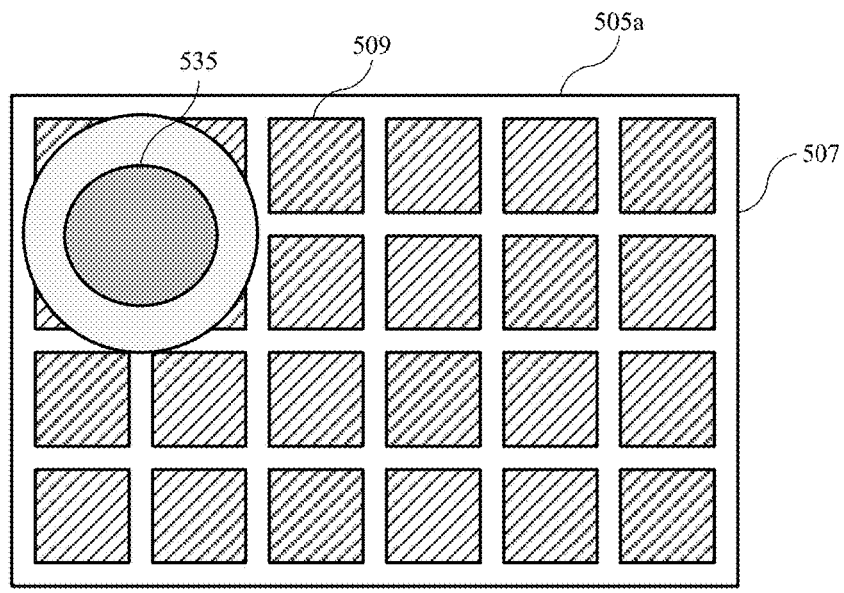
FIG. 5B illustrates a temperature profile of a top plan view of a portion of a current collector during a fault event according to embodiments of the present technology.

Moreover, the temperature increase at the site of the fault may similarly be maintained within acceptable ranges. Illustrated at FIG. 5B is a top plan view of a heat profile of a portion of current collector 505a during the fault event and penetration of nail 530. As previously discussed, the current collector 505a may include an insulative grid 507 in which is disposed a conductive material 509. The site of the penetration short circuit 535 may still show an elevated temperature as current discharges to this location. However, the temperature may be maintained within acceptable tolerances because portions of the insulative grid 507 may reduce or prevent any current flow across the current collector 505a to the site of the short circuit. Accordingly, electronic flow may instead proceed through active material layers to the site of the short circuit, which may substantially reduce the time of discharge, the electric charge transferred at the site of the short circuit, and the heat generated due to the charge transfer. These benefits may be produced from several current collector designs of the present technology, which may include increased resistivity in the XY-plane compared to conventional designs, or protective devices within the structure. The remaining portions of the disclosure will discuss several of these designs.

Figure 6:
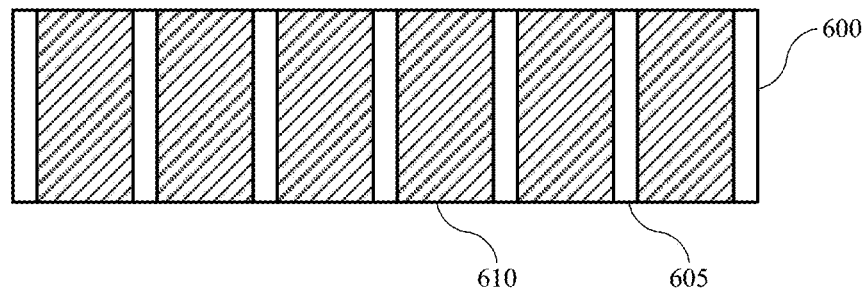
FIG. 6 shows an exemplary cross-sectional view along line A-A from FIG. 3 of a current collector according to embodiments of the present technology.

FIG. 6 shows an exemplary cross-sectional view along line A-A from FIG. 3 of a current collector 600 according to embodiments of the present technology. The current collector 600 may include an insulative grid 605, and may include a conductive material 610 disposed within the insulative grid 605. Insulative grid 605 may be composed of an insulative material including a polymeric material or a ceramic material. Additionally, insulative grid 605 may be one or more plastic materials including, as non-limiting examples, polyethylene, polypropylene, polyvinylchloride, other polymeric carbon-containing materials including rubbers, phthalate containing materials including diethylhexyl phthalate, halogen-containing polymers including polytetrafluoroethylene, fluorinated ethylene propylene, ethylene tetrafluoroethylene, perfluoroalkoxy, silicon-containing materials, or other insulating materials. Insulating grid 605 may also include combinations of materials, such as those listed, to produce particular chemical and electrical properties. For example, the insulating grid may be designed based on properties of the electrolyte with which it is in contact, as well as the electrical potential at which the current collector may operate.

Conductive material 610 may include any conductive material that my operate within the current collector. In embodiments the conductive material 610 may include silver, copper, aluminum, iron, stainless steel, carbon particulates, or other conductive materials and metals as would be understood by the skilled artisan. The conductive material 610 may include composite materials including one or more of the listed materials, as well as polymeric and/or ceramic material. The composite materials may be produced to provide a resistivity higher than purer materials. As previously discussed, because the electronic conductivity occurs in the Z-direction for the described batteries, the distance traversed may be orders of magnitude less than in a conventional battery. Accordingly, utilizing materials with lower conductivity may have limited impact on cell capacity and performance, while providing benefits including during failure events. Such materials may not be acceptable in conventional designs where increased conductivity is often sought.

Current collector 600 may have an in-plane resistivity across a length in the XY-plane that is greater than or about $1\times10^{-8}$ ohm-m in embodiments in which a material such as copper may be used. However, based on the cell operation, current collector 600 may have an in-plane resistivity across the current collector of greater than or about $1\times10^{-7}$ ohm-m, greater than or about $1\times10^{-6}$ ohm-m, greater than or about $1\times10^{-5}$ ohm-m, greater than or about $1\times10^{-4}$ ohm-m, greater than or about 0.005 ohm-m, greater than or about 0.01 ohm-m, greater than or about 0.05 ohm-m, greater than or about 0.1 ohm-m, greater than or about 0.5 ohm-m, greater than or about 1 ohm-m, greater than or about 10 ohm-m, greater than or about 100 ohm-m, greater than or about 1,000 ohm-m, greater than or about 10,000 ohm-m, or more in embodiments. Additionally, current collector 600 may have an in-plane resistivity of between about $1\times10^{-5}$ ohm-m and about 1,000 ohm-m. Current collector 600 may also have an in-plane resistivity between about 0.005 ohm-m and about 1 ohm-m, or between about 0.05 ohm-m and about 1 ohm-m.

The insulative grid may control the in-plane resistivity, although the conductive material disposed within the grid may also impact the resistivity. In some embodiments, the conductive material may be maintained fully within the conductive grid in embodiments, and each region of conductive material 610 may be fully isolated from proximate regions by the conductive grid 605. Additionally, current collector 600 may be configured to maintain a liquid seal across the current collector. For example, the insulative grid 605 and conductive material may together form a liquid barrier across the current collector 600, and may form a vapor barrier across the current collector in embodiments.

Figure 7A:
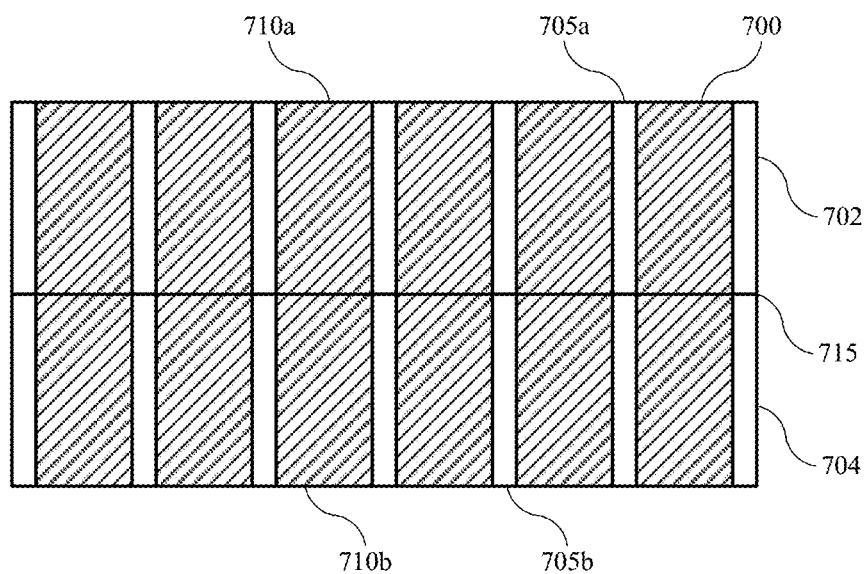
FIG. 7A shows an exemplary cross-sectional view of a current collector according to embodiments of the present technology.

FIG. 7A shows an exemplary cross-sectional view of a current collector 700 according to embodiments of the present technology. Current collector 700 may be similar to stacked current collector 150 previously described, and may include some or all aspects of that stacked current collector as well as some or all aspects of current collector 600 previously described. Current collector 700 may include one or more insulative grids 705a-b. Insulative grid 705a may be directly coupled with insulative grid 705b, or insulative grid 705a and insulative grid 705b may be a single continuous design. Within a battery, such as a stacked battery, current collector 700 may include a first layer 702 in contact with a first cell of the stacked battery, and a second layer 704 in contact with a second cell of the stacked battery. For example, first layer 702 may be in contact with an active material of the first cell, such as an anode active material, for example. Additionally, second layer 704 may be in contact with an active material of the second cell, such as a cathode active material, for example.

Current collector 700 may also include conductive materials 710a-b disposed within the current collector 700. Accordingly, each of first layer 702 and second layer 704 may include an insulative grid 705 having a conductive material 710 disposed within the insulative grid. In embodiments, conductive materials 710a and 710b disposed within the insulative grid of the first layer 702 and the second layer 704 may be similar materials or identical materials. As one non-limiting example, the conductive material 710 may be or include stainless steel in each of first layer 702 and second layer 704. For example, an identical conductive material 710 may be disposed within each insulative grid 705, or similar but tuned composite materials may be disposed in the insulative grids. For example, because the two regions may be operating at different potential, if a composite material is used, certain components may be similar between the composites, but other materials may be different or adjusted to account for operation at the different potential. Identical composite material may additionally be used for conductive materials 710.

In other embodiments conductive material 710a may be a different material than conductive material 710b. For example, first layer 702 may be in contact with an anode active material of a first cell. The conductive material 710a within the insulative grid of first layer 702 may be a material that may operate at anode potential in a stacked battery, and may be or include copper, stainless steel, a carbon-containing material, or a composite having electrical characteristics based on anode potential. Similarly, for example, second layer 704 may be in contact with a cathode active material of a second cell. The conductive material 710b within the insulative grid of second layer 704 may be a material that may operate at cathode potential in a stacked battery, and may be or include aluminum, stainless steel, a carbon-containing material, or a composite having electrical characteristics based on cathode potential. Any other material that may affect electrical characteristics of the current collector may also be used in either conductive material 710 as would be understood by the skilled artisan.

Figure 7B:
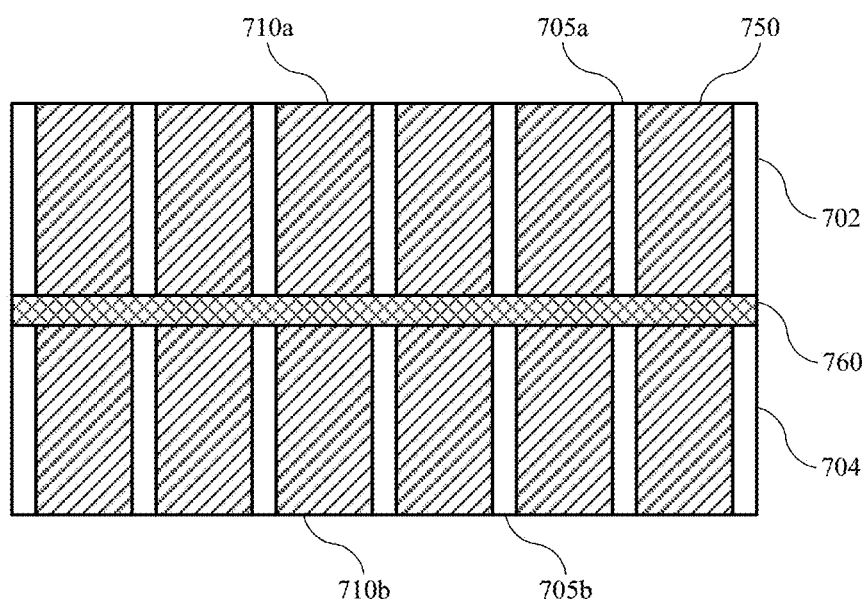
FIG. 7B shows an exemplary cross-sectional view of a current collector according to embodiments of the present technology.

Between first layer 702 and second layer 704 may be an interface 715. Interface 715 may be a fluid impermeable interface between the two layers. For example, first layer 702 and/or second layer 704 may be fluid impermeable, and thus the interface 715 may be fluid impermeable. Another design is illustrated in FIG. 7B, and shows an exemplary cross-sectional view of another current collector according to embodiments of the present technology. Current collector 750 may be similar to current collector 700, and may include a first layer 702 having insulative grid 705a and conductive material 710a. Current collector 750 may additionally include second layer 704 having insulative grid 705b and conductive material 710b. Any of the materials and characteristics of stacked devices previously described may be included in current collector 750. Current collector 750 may also include layer 760 disposed between first layer 702 and second layer 704. Layer 760 may be a coupling material, such as an adhesive, and may also be a barrier layer between the first layer 702 and the second layer 704. A barrier layer may include material that is fluid impermeable, and thus may be an ionic barrier, but may not be an electronic separator or barrier. Accordingly, in embodiments layer 760 may be at least partially conductive. The layer 760 may also provide additional safety functionality between a fist cell and a second cell utilizing the stacked current collector 750.

Layer 760 may also provide a fusing or separator mechanism between a first cell and a second cell in embodiments. For example, layer 760 may be or include a layer of positive temperature coefficient ("PTC") material positioned between the first layer 702 and the second layer 704 of the stacked current collector 750. The PTC fusing capability in region 750 may operate to separate adjoining cells during fault events such as previously described. The PTC material may include a polymer that is itself conductive at low temperature, but which becomes highly resistive at increased temperature. Thus, when the temperature returns to normal operating conditions, the polymer may recover its conductive properties. This may not matter for fault events causing permanent failure of a battery, but electronically separating the individual cells of the battery by electrically decoupling the stacked current collector layers between each cell may reduce the influx of current and associated heat increase of a fault event. The PTC material may also be designed to allow minimal resetting, or be non-resettable in embodiments. Thus, the PTC material may be able to overcome the temperature increase of a momentary event, however the PTC material may be configured so that during major fault conditions like overcurrent or short-circuit, the PTC material may be activated, or may physically separate the cells to prevent any electronic flow between cells. In order to provide the non-resettable characteristics of the PTC material that may be located in or may be layer 760, the layer of PTC material may be modified with characteristics intended to ensure the fuse does not reset.

For example, under normal operating temperatures, the PTC layer may impart an impedance of less than or about 1 milliohm, less than or about 0.1 milliohms, less than or about 0.01 milliohms, or between about 0.001 milliohms and about 0.1 milliohms. As the temperature exceeds acceptable limits of the normal operating window, such as by an increased electronic flow that causes heat generation at a particular location or within a layer of a cell, the PTC layer may provide an increased impedance as the structure of the PTC layer adjusts due to the increased temperature. For example, the impedance may increase to more than or about 1 megaohm, more than or about 5 megaohms, more than or about 10 megaohms, more than or about 20 megaohms, or more than or about 50 megaohms by separating the conductive materials, such as carbon, within the structure of the material. This may also provide a resettable structure in that as the temperature decreases, the impedance may also decrease to the original conditions.

The PTC material may include additional materials in addition to the polymeric materials discussed. For example, the polymeric materials may provide a structure that incorporates and contains additional conductive material mixed with the binder or polymer of the PTC material. The conductive material may aid operation of the conductive path during normal operation, and allow electrical flow across the PTC material. For example, conductive material may include a powder of conductive material that is mixed with the polymeric structure. The conductive material may provide enhanced conductive paths through the PTC material in order to maintain a low impedance through the fuse element. The conductive material may be particulate or powders of conductive materials including silver, copper, zinc, nickel, carbon-containing materials including carbon black, or other conductive materials that may be admixed with polymeric components such as those previously discussed.

Upon realizing temperatures that exceed a determined operating window for an exemplary stacked battery, the polymeric structure may swell sufficiently to separate or isolate the conductive material, which may produce an impedance increase sufficient to interrupt current flow through the device. The swelling of the PTC material may be on the order of a few microns, for example, or more in embodiments. The PTC material may be contained between current collector layers 702 and 704 at a thickness of from about 1 µm to about 50 µm in embodiments. The thickness of the PTC material may also be from about 3 µm to about 30 µm, or from about 5 µm to about 20 µm. The swelling may be less than about 20 µm increase in thickness, less than about 15 µm increase in thickness, less than about 10 µm increase in thickness, less than about 5 µm increase in thickness, or less than about 1 µm increase in thickness. The swelling may produce a reduction in the bonding strength of the PTC material. Thus, when used in non-resettable embodiments, the swelling of the PTC material may not revert when the temperature is reduced, and may permanently interrupt current across the stacked current collector between or associated with two adjacent cells.

Figure 8:
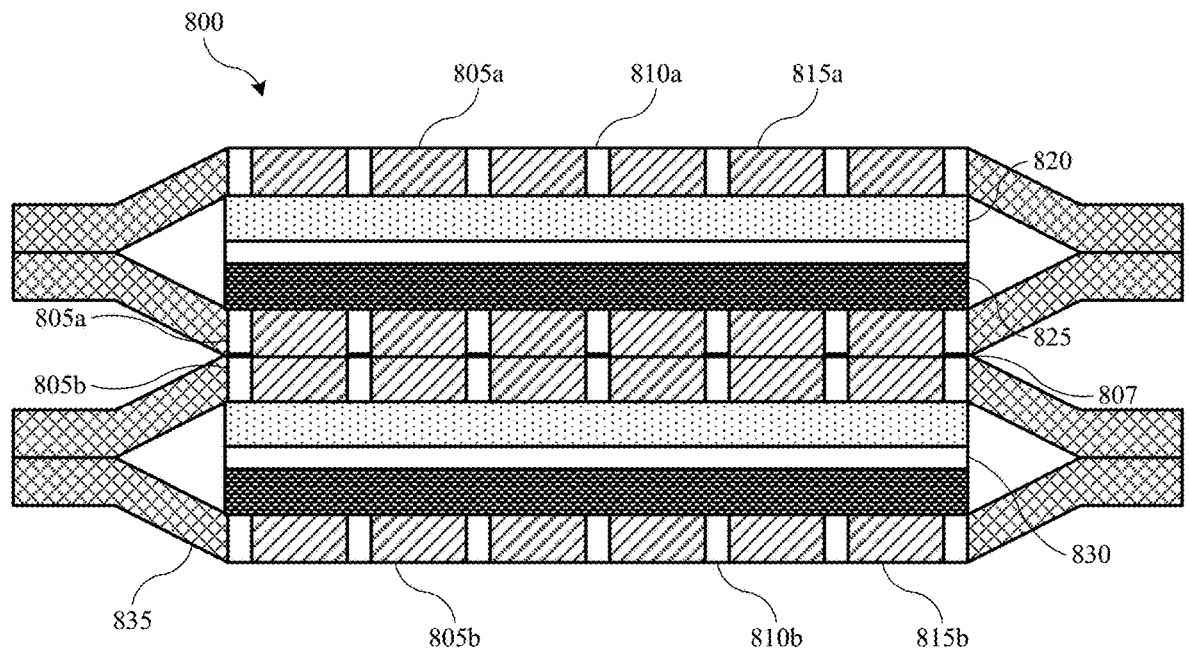
FIG. 8 shows an exemplary cross-sectional view of a battery cell according to embodiments of the present technology.

FIG. 8 shows an exemplary cross-sectional view of two battery cells 800 according to embodiments of the present technology. Battery cells 800 may be similar to any of the previously described embodiments, and may be cells included in any of the battery structures previously described. For example, battery cells 800 may be two of many cells in a stacked battery, such as discussed with respect to FIG. 1, for example. Battery cells 800 may include two first current collectors 805a and two second current collectors 805b. The current collectors 805 may be portions of the stacked current collectors previously described. For example, current collector 807 may be a single stacked current collector, or may be first and second layers of a stacked current collector as previously described.

Each current collector 805 may include an insulative grid 810 in which a conductive material 815 is disposed, similar to the design discussed previously. Each current collector 805 may have similar or different materials included as or with the insulative grid 810 as well as with the conductive material 815. In other embodiments, current collectors 805 may have different materials or variations on materials. For example, current collectors 805a may include a similar material for the conductive material 815a, and current collectors 805b may include a similar material for the conductive material 815b. As one non-limiting example, current collectors 805a may include an aluminum material or composite as the conductive material 805a, and current collectors 805b may include a stainless steel material or composite as the conductive material 805b. Other variations as previously discussed are similarly encompassed, as would be readily apparent to the skilled artisan.

Each cell of battery cells 800 may include a cathode material 820, and anode material 825, and a separator 830 within the cell. Any of the previously discussed materials may be utilized in the battery cell electrodes. Additionally, each current collector, including stacked current collector 807 may include a coupling material 835 positioned about a perimeter of the insulative grid. Coupling material 835 may include a polymeric material that extends about an exterior of insulative grid 805 of each current collector, or current collector layer, such as for the stacked current collector 807. Coupling material may provide an insulation material for joining the cells of the battery.

As previously discussed with respect to FIG. 1, for example, the stacked battery cells may include a gap region 155 at an exterior of the current collector materials. The material in the gap region may be used to seal the cells of the stacked battery. In the design discussed in that figure, a seal 140 may be included along with a tape 145 to electrically protect the current collectors, which may be conductive from shorting to adjoining layers. The seal 140 and tape 145 may fluidly seal the cell of the battery cell, and may also provide an electrical barrier between the current collectors of the cell. Coupling material 835, however, may obviate the need for the seal 140 as well as the tape 145, although in some embodiments the stacked design may include seal 140 and tape 145.

Coupling material 835 may include a polymer such as an insulating polymer that may be coupled, bonded, or otherwise connected with or to a coupling material 835 from the opposite current collector of the individual cell. Unlike conductive current collector materials, coupling material 835 may not pose a risk of electrically shorting the cell, as the coupling material 835 may be insulative, and coupling material 835 may electrically separate the cells from each other in a way similar to seal 140 and tape 145 discussed above. The coupling material 835 may be coupled with the individual current collector during manufacturing, and then subsequent cell assembly may be joined with the coupling material 835 of the paired current collector of the cell. For example, coupling material 835 may be joined or bonded with a conductive current collector such as illustrated in FIG. 1, and may also be joined with an insulative material, which may similarly be a polymeric material, such as with insulative grid 805 or 507 as previously described.

Coupling material 835 may include any number of polymeric components or combinations to provide useful characteristics for the coupling material. For example, the coupling material 835 may include any of the previously described insulative materials. Coupling material 835 may include polyolefins such as polypropylene, polyethylene, or other thermoplastic olefins or elastomers including butyl compounds such as isobutylene, isoprenoids, or other compounds that may impart particular characteristics on the coupling material. For example, compounds may be included to provide stability of the material within the electrolytic substances. Compounds, monomers, or functional groups may also be included to provide sealant characteristics, flexibility, stiffeners, or other functional characteristics useful in a coupling material.

During manufacturing or production, the coupling material 835 may be heat sealed, pressure sealed, bonded, adhered, or otherwise joined with the coupling material 835 of the other current collector of the battery cell. Once joined, the coupling material may provide a liquid and/or vapor seal about the battery cell, and may reduce the material and production costs associated with joining conductive current collectors. By reducing the area of the current collector to the area of the operating cell itself, the coupling material 835 may be used to provide the sealing and protection of the cell without additional materials. Such a coupling material may be utilized with any of the current collector configurations or designs discussed throughout the present application, as well as many other designs that would benefit from the characteristics discussed.

Figure 9:
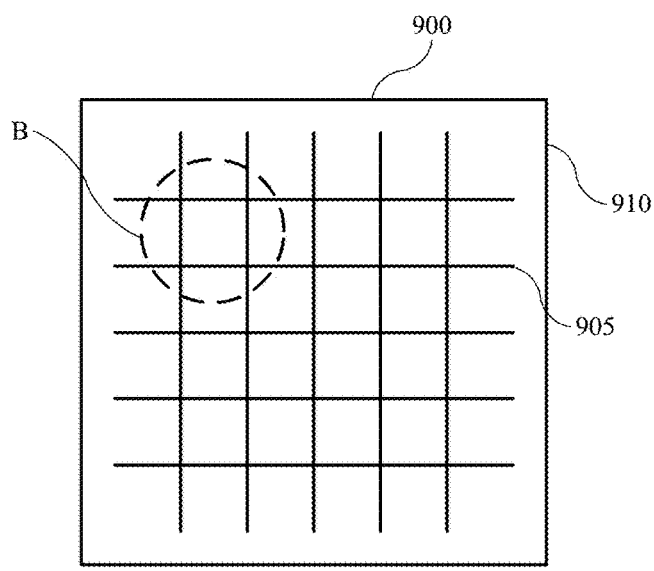
FIG. 9 shows a top plan view of a portion of a current collector according to embodiments of the present technology.

Turning to FIG. 9 is shown a top plan view of a portion of a current collector 900 according to embodiments of the present technology. Current collector 900 may be used in a multi-cell battery or single-cell battery including any of the stacked battery configurations previously described. For example, an exemplary multi-cell battery may include a first cell including a first current collector, a first anode, a first cathode, and a second current collector. The exemplary multi-cell battery may also include a second cell including a third current collector, a second anode, a second cathode, and a fourth current collector. One or more additional cells may be included in the multi-cell battery in embodiments as well. Several of the figures include structures illustrating these features. Such as in any of the previously discussed stacked configurations, the second current collector and the third current collector of the multi-cell battery may be coupled with one another across a surface of each of the second current collector and the third current collector. Current collector 900 may be any one up to all of the current collectors in the exemplary multi-cell battery, or in any of the configurations discussed elsewhere in the disclosure. Additionally, any of the other described current collector designs may be used or combined in cells or across cells in the battery in a variety of combinations.

Current collector 900 may include a conductive grid 905. In some embodiments conductive grid 905 may be disposed in an insulative material 910. The conductive grid 905 may be or include a weave of conductive wires or fibers, a welded number of conductive elements, a deposited array of conductive elements, or a layered number of conductive elements that may be disposed within the insulative material 910. In some embodiments the conductive elements may be fully disposed within the insulative material, and may be completely surrounded by insulative material 910, such that no portion of conductive grid 905 may be directly in contact with any other material of a cell. Additionally, the insulative material 910 may be coated about the conductive grid 905 allowing a surface of the grid 905 to be exposed to contact additional components, such as active material layers of the cell. Additionally, current collector 900 may include a coupling material positioned about a perimeter of the insulative material as previously discussed.

The current collector 900 may include any of the previously described conductive materials to impart conductive characteristics to the current collector 900. For example, in embodiments each current collector of an exemplary multi-cell battery may include current collector 900, and conductive grid 905 may be the same or a similar material in each current collector. In one non-limiting example, a similar material may be stainless steel or a conductive composite material that may be capable of or configured to operate at both anode and cathode potential. Additionally, the conductive grid 905 may be different materials for different current collectors. For example, in an exemplary multi-cell battery such as identified above, the first current collector and the third current collector may include a first material in the conductive grid. Additionally, the second current collector and the fourth current collector may include in the conductive grid a second material different from the first material. For example, in one non-limiting embodiment, the first material may be aluminum, and the second material may be stainless steel or copper.

The insulative material 910 may include any of the polymeric or insulative materials discussed elsewhere in the disclosure. The combination of the conductive grid 905 and the insulative material 910 may provide a fluid impermeable current collector in embodiments, and may provide a vapor barrier, while allowing electronic conductivity across the current collector 900. The current collector 900 may provide an amount of conductivity in the XY-plane of the current collector 900 in part from the conductive grid that extends continuously through the current collector. In some embodiments the dimensions and materials of the conductive grid 905, as well as the properties and coverage of the insulative material 910, may be used to adjust the conductivity of the current collector 900.

As previously discussed, the current collector 900 may be used in a stacked battery design in which the electronic flow is in the Z-direction of the cell components, which may be of a smaller dimension than in an XY-plane. Accordingly, by reducing the conductivity of the current collector 900, safety protections may be imparted to the current collector without affecting, or without critically affecting, the cell capacity or performance. In embodiments, the conductive grid 905 and insulative material 910 may be configured to provide an in-plane resistivity across a length in the XY-plane that is greater than or about $1 \times 10^{-8}$ ohm-m in embodiments in which a material such as copper may be used, and may be fully exposed from the insulative material. However, based on the cell operation, current collector 900 may have an in-plane resistivity across the current collector of similar units as discussed previously for current collector 600. For example, current collector 900 may have an in-plane resistivity of between about $1 \times 10^{-5}$ ohm-m and about 1,000 ohm-m. Current collector 900 may also have an in-plane resistivity between about 0.005 ohm-m and about 1 ohm-m, or between about 0.05 ohm-m and about 1 ohm-m.

In some embodiments current collector 900 may additionally include a current interrupt component within or associated with the current collector. One or more current collectors of the exemplary multi-cell battery may include a current interrupt device within or associated with the current collector, and in embodiments each current collector 900 may include or be associated with a current interrupt component. For example, a current interrupt component may include a PTC material as previously described. In embodiments, a PTC material may be disposed with the insulative material 910, and may be incorporated into the insulative material 910 or may be disposed on the insulative material 910. The PTC material may be configured to expand at a predetermined temperature and separate the current collector from an adjacent component layer.

The PTC material may be incorporated uniformly within the insulative material 910, or may reside in regions of the insulative material 910. For example, the PTC material may be located in a plurality of regions of the insulative material, and when activated as previously described may electrically isolate or separate the current collector from adjacent components. The PTC material may be disposed on one or both surfaces of the current collector 900 in contact with adjacent material layers in embodiments. Additionally, the PTC material may be disposed between adjoining current collectors of a stacked current collector. For example, with reference to the above-identified multi-cell battery, the PTC material may be disposed between the second current collector and the third current collector. In embodiments, the PTC material may be configured to expand at a predetermined temperature to electrically decouple the first cell and the second cell. The predetermined temperature of the PTC material activation may be based on an operating window for the battery cell or coupled battery. For example, the temperature may be based on the materials included within the cell or cells, but may be based on an operating window. In embodiments, the PTC material may be configured to activate at a temperature below about 500° C., below about 400° C., below about 300° C., or lower depending on temperature effects on constituent components.

Figure 10A:
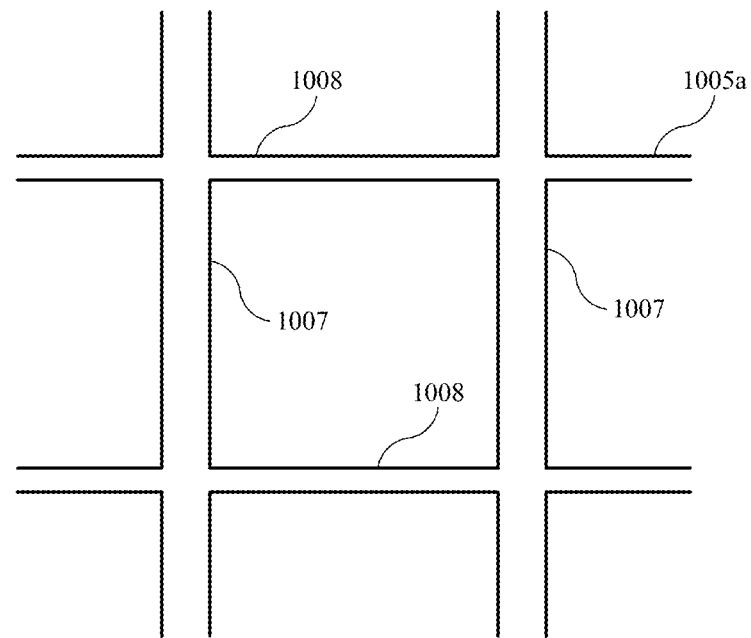
FIG. 10A shows an exemplary schematic detailed view of region B from FIG. 7 of a current collector according to embodiments of the present technology.

Additional current interrupt components may include features of the conductive grid 905 itself. Illustrated in FIG. 10A is shown an exemplary schematic detailed view of region B from FIG. 9 of a current collector conductive grid 1005a according to embodiments of the present technology. As illustrated, the conductive grid may include a current interrupt component that may be the conductive grid itself. For example, the current interrupt component may include a plurality of regions of the conductive grid 1005 that may be characterized by reduced dimensions. The conductive materials included or composing the conductive grid 1005 may be sized to operate or configured to provide a fusing capability within the current collector. For example, by reducing a wire size within the grid, heat generated by a high-current event, such as a short-circuit, may cause regions of the conductive grid to break, which may reduce or interrupt current flow through the current collector.

For conductive grid 1005a, the grid may include a plurality of crossed grid members 1007, 1008. The plurality of regions of the conductive grid 1005a may include parallel grid members 1008 characterized by a grid member thickness less than a grid member thickness of parallel crossing grid members 1007. The grid may be positioned such that the thicker grid members 1007 are positioned in a direction such that they contact the active material and grid members 1008, but may not contact other conductive materials. During a fault event across conductive grid 1005a, such as a short-circuit for example, heat may be generated due to current flow across the conductive members 1007, 1008. Due to the reduced size of grid members 1008, the members may heat more rapidly than grid members 1007. At a temperature that may be determined to cause a trip event of grid members 1008, the grid members may separate or break between grid members 1007, which may electrically insulate the grid members 1007 from one another. In this way, current flow across the current collector 1005a may be reduced, and generated heat may be dissipated, or may be prevented from further increases that may cause further issues within the battery cell.

Figure 10B:
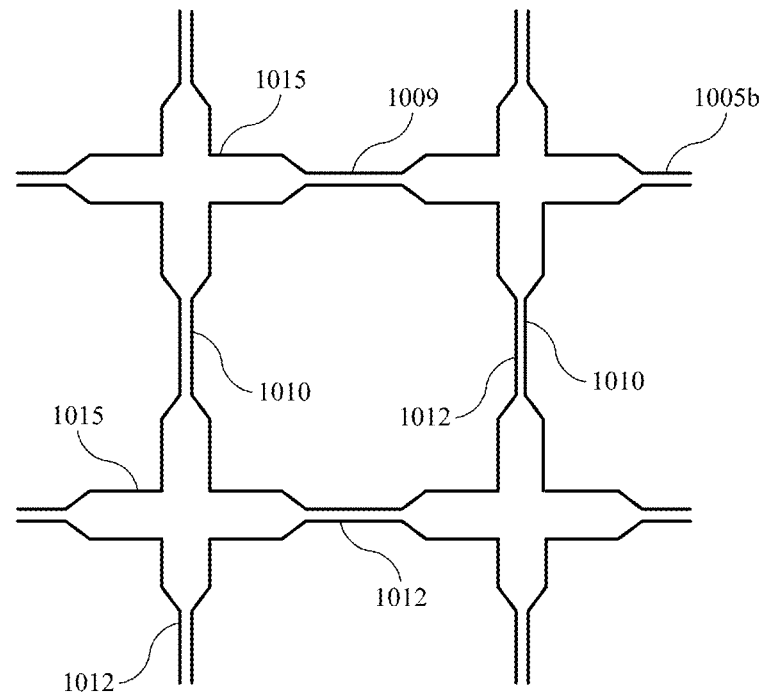
FIG. 10B shows an exemplary schematic detailed view of region B from FIG. 7 of a current collector according to embodiments of the present technology.

FIG. 10B shows an exemplary schematic detailed view of region B from FIG. 9 of a current collector 1005b according to embodiments of the present technology. As illustrated, conductive grid 1005b may also include a plurality of crossed grid members 1009, 1010. The plurality of regions of reduced dimensions may include portions 1012 of the grid members located between grid nodes 1015. Portions 1012 may be similar to fuse elements in which the dimensions of the region may cause heat buildup, and failure or breakage at certain current flow or associated temperature. For example, during a fault event across conductive grid 1005b, heat may be generated due to current flow across the grid members 1009, 1010.

Due to the reduced dimensions of portions 1012, those regions may heat more rapidly than the portions around nodes 1015. At a current flow or associated temperature that may be determined to break or trip portions 1012, the portions 1012 may break and electrically isolate regions or the entire current collector 1005b. In both exemplary conductive grids 1005, the plurality of regions of reduced dimensions may be continuous across the conductive grids, or may be selectively positioned about the conductive grids. For example, portions 1012 of conductive grid 1005b may be included after every other grid node 1015, as opposed to between every grid node 1015. Because a trip event may fully isolate regions of the conductive grid 1005b, the regions may include larger sections of the conductive grid, which may reduce material or production costs in forming the plurality of regions of reduced dimensions. Aspects of the grids of FIGS. 10A and 10B may be combined, and encompass examples only. Additional fusing or tripping components encompassed by the present technology may also be incorporated within the grid as would be understood by the skilled artisan.

Figure 11:
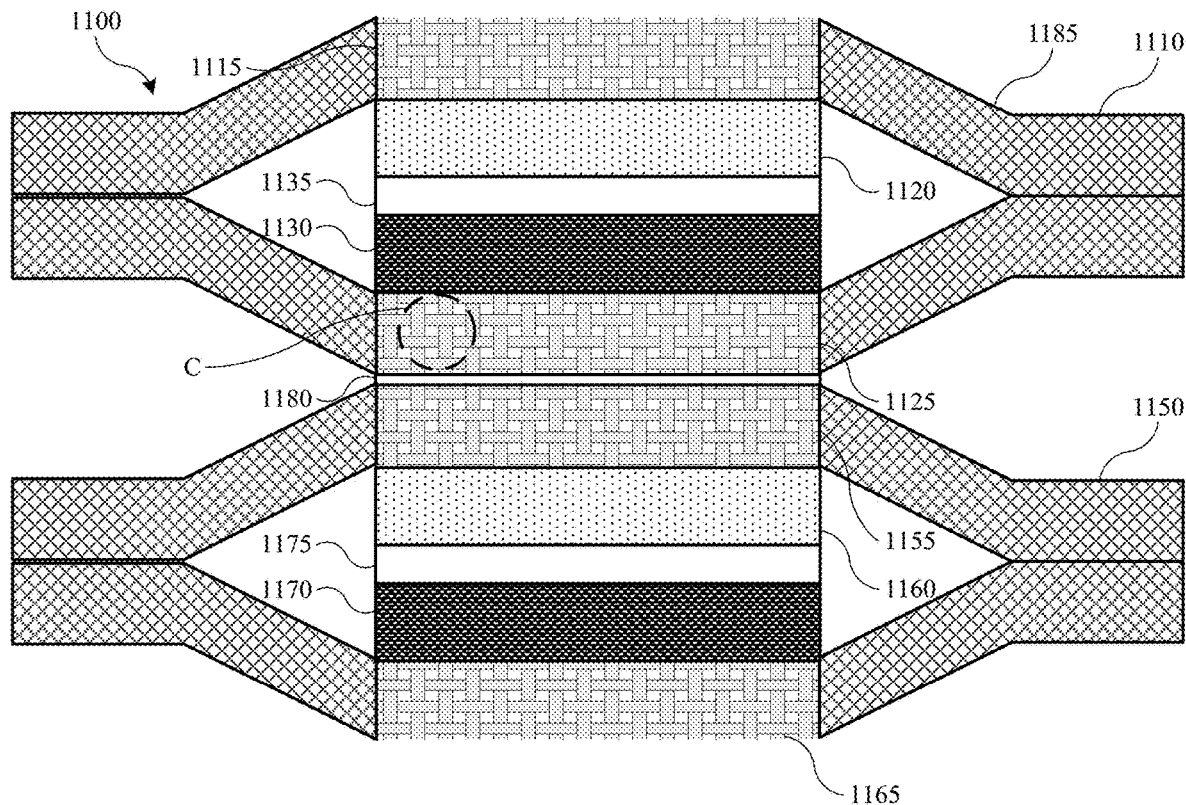
FIG. 11 shows a cross-sectional view of an exemplary battery according to embodiments of the present technology.

Turning to FIG. 11 is shown a cross-sectional view of an exemplary battery 1100 according to embodiments of the present technology. Exemplary battery 1100 may include another current collector configuration that may provide adjusted or modified in-plane current flow according to the present technology. Battery 1100 may include a first cell 1110 including a first current collector 1115 coupled with a first cathode material 1120. First cell 1110 may also include a second current collector 1125 coupled with a first anode material 1130. First cell 1110 may also include a separator 1135 disposed between the cathode material 1120 and the anode material 1130.

Battery 1100 may further include a second cell 1150 including a third current collector 1155 coupled with a second cathode material 1160. Second cell 1150 may also include a fourth current collector 1165 coupled with a second anode material 1170. Second cell 1150 may also include a separator 1175 disposed between the cathode material 1160 and the anode material 1170. As illustrated, the second current collector 1125 and the third current collector 1155 may be coupled with one another.

An optional layer 1180 may be positioned between the second current collector 1125 and the third current collector 1155, or the two current collectors may be directly coupled with one another. Optional layer 1180 may include a sealing or coupling material as previously explained that may provide a fluid seal between the first cell 1110 and the second cell 1150. Additionally, each current collector may include a coupling material 1185 positioned about a perimeter of the current collector, such as discussed previously with regard to FIG. 8 In embodiments, the coupling material 1185 may include a polymeric material, and may be or include, for example, a polyolefin. The materials utilized in the anode and cathode materials may be any of the previously described materials.

Figure 12:
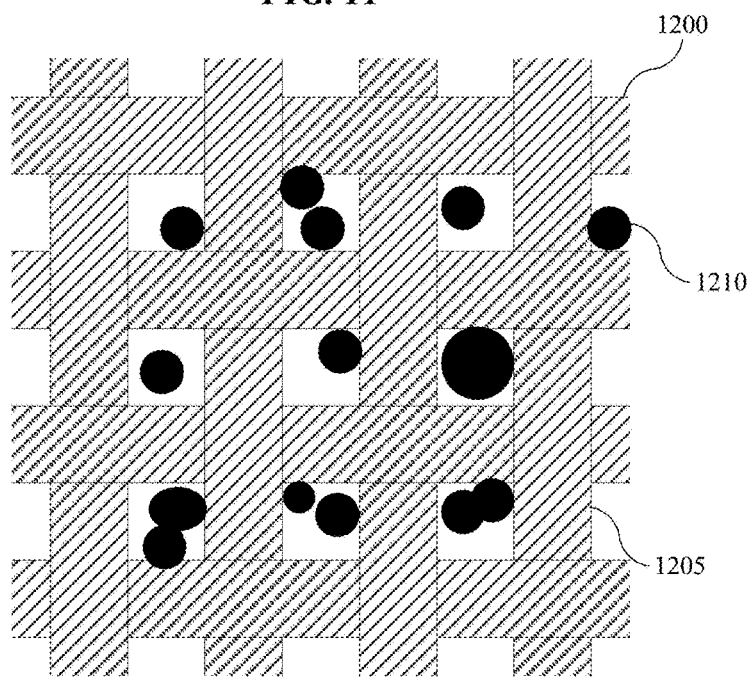
FIG. 12 shows an exemplary schematic detailed view of region C from FIG. 11 of a current collector according to embodiments of the present technology.

The current collectors of battery 1100, including for both first cell 1110 and second cell 1150 may include an insulative matrix containing a conductive material within interstices of the insulative matrix. FIG. 12 shows an exemplary schematic detailed view of region C from FIG. 11 of a current collector according to embodiments of the present technology. As illustrated, current collector 1200 may include a matrix material 1205 that may be insulative. The current collector 1200 may also include conductive material 1210 incorporated within the matrix 1205, such as contained within interstices of the insulative matrix 1205.

The insulative matrix 1205 may include a polymer disposed as the matrix material or as part of the matrix material. The polymer matrix may be developed with a conductive material to produce a current collector having particular electrochemical or composite properties. For example, conductive particulate material may be admixed with the polymer material in a fluid stage. The polymer material may then be formed and cured as a current collector insulative matrix 1205, which may include the conductive material 1210 within the matrix. The conductive material may include any of the conductive materials previously identified. In embodiments, the conductive material may include one or more of silver, aluminum, copper, stainless steel, and a carbon-containing material. Coupling material 1185 may be the same material or a different material as the current collector matrix material 1205 in embodiments. For example, coupling material 1185 may be or include insulative matrix 1205, but may include an unfilled insulative matrix that may not include conductive material 1210. Coupling material 1185 may also include a modified version of the insulative matrix 1205 in order to provide additional features or functionality as previously described. Coupling material 1185 may also include a material as previously discussed that may be coupled with, bonded to, or joined with current collector 1200 insulative matrix 1205.

Insulative matrix 1205 containing conductive material 1210 may provide a uniform conductive profile throughout the current collector 1200. However, based on the inclusion of conductive material, as well as the properties of the matrix material, the current collector 1200 may have a tuned resistivity to provide similar characteristics as other configurations discussed throughout the present disclosure. For example, the produced current collector 1200 may be configured to provide an in-plane resistivity across a length in the XY-plane, as well as a through-plane resistivity in the Z-direction, which is greater than or about $1 \times 10^{-4}$ ohm-m in embodiments. In other embodiments, current collector 1200 may have an in-plane resistivity across the current collector and a through-plane resistivity of similar units as discussed previously for current collector 600 and 900. For example, current collector 1200 may have an in-plane and through-plane resistivity of between about $1 \times 10^{-3}$ ohm-m and about 1,000 ohm-m. Current collector 1200 may also have an in-plane and through-plane resistivity between about 0.05 ohm-m and about 1 ohm-m, or an in-plane and through-plane resistivity of about 0.5 ohm-m in embodiments. Finally, although illustrated separately for ease of description, it is to be understood that any combination of the current collectors described may be utilized in a battery cell, or in different cells within a single battery.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. For example, embodiments of current collectors described above may be incorporated into battery packs of other stacked designs such as bipolar and MCS batteries. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the cell" includes reference to one or more cells and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A stacked battery comprising:
    a first cell having a first current collector including a first insulative substrate defining a first grid pattern of a plurality of first electrically isolated regions, the first current collector further including a respective first plate of a plurality of first plates disposed within each of the plurality of first electrically isolated regions; and
    a second cell stacked on the first cell and having a second current collector including a second insulative substrate defining a second grid pattern of a plurality of second electrically isolated regions, the second current collector further including a respective second plate of a plurality of second plates disposed within each of the plurality of second electrically isolated regions,
    wherein first conductive regions of the first current collector are aligned in a through-plane direction with second conductive regions of the second current collector such that the plurality of first plates is aligned with and attached to the plurality of second plates.

2. The stacked battery of claim 1, wherein the first conductive regions and the second conductive regions comprise conductive material that facilitates through-plane current flow between the first cell and the second cell, and wherein the first insulative substrate and the second insulative substrate impede in-plane current flow across the first current collector and the second current collector.

3. The stacked battery of claim 2, wherein the first conductive regions and the second conductive regions comprise stainless steel.

4. The stacked battery of claim 2, wherein the first conductive regions and the second conductive regions comprise a conductive composite material.

5. The stacked battery of claim 1, wherein an in-plane resistivity of the first current collector is at least 0.005 ohm-meters across a length of the first current collector.

6. The stacked battery of claim 1, wherein an interface between the first current collector and the second current collector is fluid impermeable.

7. The stacked battery of claim 1, wherein the first conductive regions and the second conductive regions are the same material.

8. The stacked battery of claim 1, wherein the first current collector further comprises a coupling material positioned about a perimeter of the first insulative substrate.

* * * * *